US012792400B2

(12) United States Patent
Haridas et al.

(10) Patent No.: US 12,792,400 B2
(45) Date of Patent: Nov. 10, 2026

(54) METHODS AND APPARATUS TO GENERATE AND MANAGE LOGICAL WORKLOAD DOMAIN CLUSTERS IN A COMPUTING ENVIRONMENT

(71) Applicant: VMware LLC, Palo Alto, CA (US)

(72) Inventors: Saritha Haridas, Bengaluru (IN); Kalyan Devarakonda, Bengaluru (IN); Akshay Anand, Bengaluru (IN); Naren Lal, Bengaluru (IN)

(73) Assignee: VMware LLC, Palo Alto, CA (US)

( * ) Notice: Subject to any disclaimer, the term of this patent is extended or adjusted under 35 U.S.C. 154(b) by 406 days.

(21) Appl. No.: 18/473,894

(22) Filed: Sep. 25, 2023

(65) Prior Publication Data

US 2025/0103392 A1 Mar. 27, 2025

(51) Int. Cl.
*G06F 9/50* (2006.01)

(52) U.S. Cl.
CPC .................................. *G06F 9/5005* (2013.01)

(58) Field of Classification Search
None
See application file for complete search history.

(56) References Cited

U.S. PATENT DOCUMENTS

| | | | | |
|---|---|---|---|---|
| 9,053,167 | B1 * | 6/2015 | Swift | G06F 16/278 |
| 9,460,185 | B2 * | 10/2016 | Swift | G06F 16/278 |
| 9,904,571 | B2 * | 2/2018 | Abali | G06F 9/5083 |
| 10,242,388 | B2 * | 3/2019 | Shen | G06Q 30/0277 |
| 10,673,981 | B2 * | 6/2020 | Sahay | G06F 9/45558 |
| 11,487,579 | B2 * | 11/2022 | Mahadik | G06F 9/50 |
| 2012/0109852 | A1 * | 5/2012 | Lingam | H04L 47/125 705/400 |

(Continued)

FOREIGN PATENT DOCUMENTS

| | | | | |
|---|---|---|---|---|
| WO | WO-2010037794 A2 * | 4/2010 | | G06F 16/278 |
| WO | WO-2012057956 A2 * | 5/2012 | | G06Q 30/283 |
| WO | WO-2020027743 A1 * | 2/2020 | | G06F 9/5077 |

OTHER PUBLICATIONS

Deepak Narayanan et al. "Solving Large-Scale Granular Resource Allocation Problems Efficiently with POP." (2021). Retrieved online Feb. 12, 2026. https://cs.stanford.edu/~fiodar/pubs/POP.pdf (Year: 2021).*

(Continued)

*Primary Examiner* — James A Reagan
(74) *Attorney, Agent, or Firm* — Kim & Stewart LLP

(57) ABSTRACT

Systems, apparatus, articles of manufacture, and methods are disclosed to generate and manage logical workload domain clusters in a computing environment. An example apparatus includes interface circuitry, machine readable instructions, and programmable circuitry to at least one of instantiate or execute the machine readable instructions to determine that a first resource usage of a first cluster in a first workload domain satisfies a threshold indicative of an upper limit of resource usage in the first cluster, identify a second cluster in a second workload domain having an availability based on a second resource usage represented resource usage data, the second workload domain logically grouped with the first workload domain based on a criterion, and reallocate a host from the second cluster to the first cluster.

18 Claims, 17 Drawing Sheets

(56) References Cited

U.S. PATENT DOCUMENTS

| | | | | |
|---|---|---|---|---|
| 2012/0131093 | A1* | 5/2012 | Hamano | G06F 9/5088 709/203 |
| 2015/0039766 | A1* | 2/2015 | Bachar | H04L 67/10 709/226 |
| 2015/0269239 | A1* | 9/2015 | Swift | G06F 16/278 707/610 |
| 2016/0378538 | A1* | 12/2016 | Kang | G06F 9/5077 718/1 |
| 2017/0052813 | A1* | 2/2017 | Abali | G06F 9/50 |
| 2017/0193561 | A1* | 7/2017 | Shen | G06Q 30/0275 |
| 2017/0364383 | A1* | 12/2017 | Feng | G06F 9/5061 |
| 2019/0014049 | A1* | 1/2019 | Nayak | H04L 47/24 |
| 2019/0034237 | A1* | 1/2019 | Siddappa | H04L 67/1012 |
| 2020/0167204 | A1* | 5/2020 | Aronovich | G06F 9/505 |
| 2020/0183758 | A1* | 6/2020 | Subramaniam | G06F 9/4856 |
| 2021/0224136 | A1* | 7/2021 | Sevim | G06F 9/5077 |
| 2021/0357255 | A1* | 11/2021 | Mahadik | G06F 11/3006 |
| 2021/0373971 | A1* | 12/2021 | Lu | G06F 9/5077 |
| 2023/0043579 | A1* | 2/2023 | Chitalwala | G06F 9/5072 |
| 2023/0058959 | A1* | 2/2023 | Kim | G06F 9/5027 |
| 2023/0176917 | A1* | 6/2023 | Lal | H04L 63/20 718/105 |
| 2023/0376359 | A1* | 11/2023 | Lu | G06F 9/547 |
| 2024/0241759 | A1* | 7/2024 | Gamage | G06F 9/4881 |
| 2024/0345911 | A1* | 10/2024 | Bellam | G06F 11/0709 |

OTHER PUBLICATIONS

Andrew Newell et al. “RAS: Continuously Optimized Region-Wide Datacenter Resource Allocation.” (Oct. 2021). Retrieved online Feb. 12, 2026. https://www.cs.cmu.edu/~dskarlat/publications/ras_sosp21.pdf (Year: 2021).*

Extended European Search Report mailed Feb. 24, 2025 in European Patent Application No. 24202334.9, 11 pages.

* cited by examiner

METHODS AND APPARATUS TO GENERATE AND MANAGE LOGICAL WORKLOAD DOMAIN CLUSTERS IN A COMPUTING ENVIRONMENT

FIELD OF THE DISCLOSURE

This disclosure relates generally to clusters and, more particularly, to methods and apparatus to generate and manage logical workload domain clusters in a computing environment.

BACKGROUND

A software-defined data center (SDDC) is a data center implemented by software in which hardware is virtualized and provided to users as services. SDDCs allow for dynamically configuring and deploying applications and resources per customer requests and per customer-defined specifications and performances.

BRIEF DESCRIPTION OF THE DRAWINGS

In general, the same reference numbers will be used throughout the drawing(s) and accompanying written description to refer to the same or like parts. The figures are not necessarily to scale.

Figure 1:
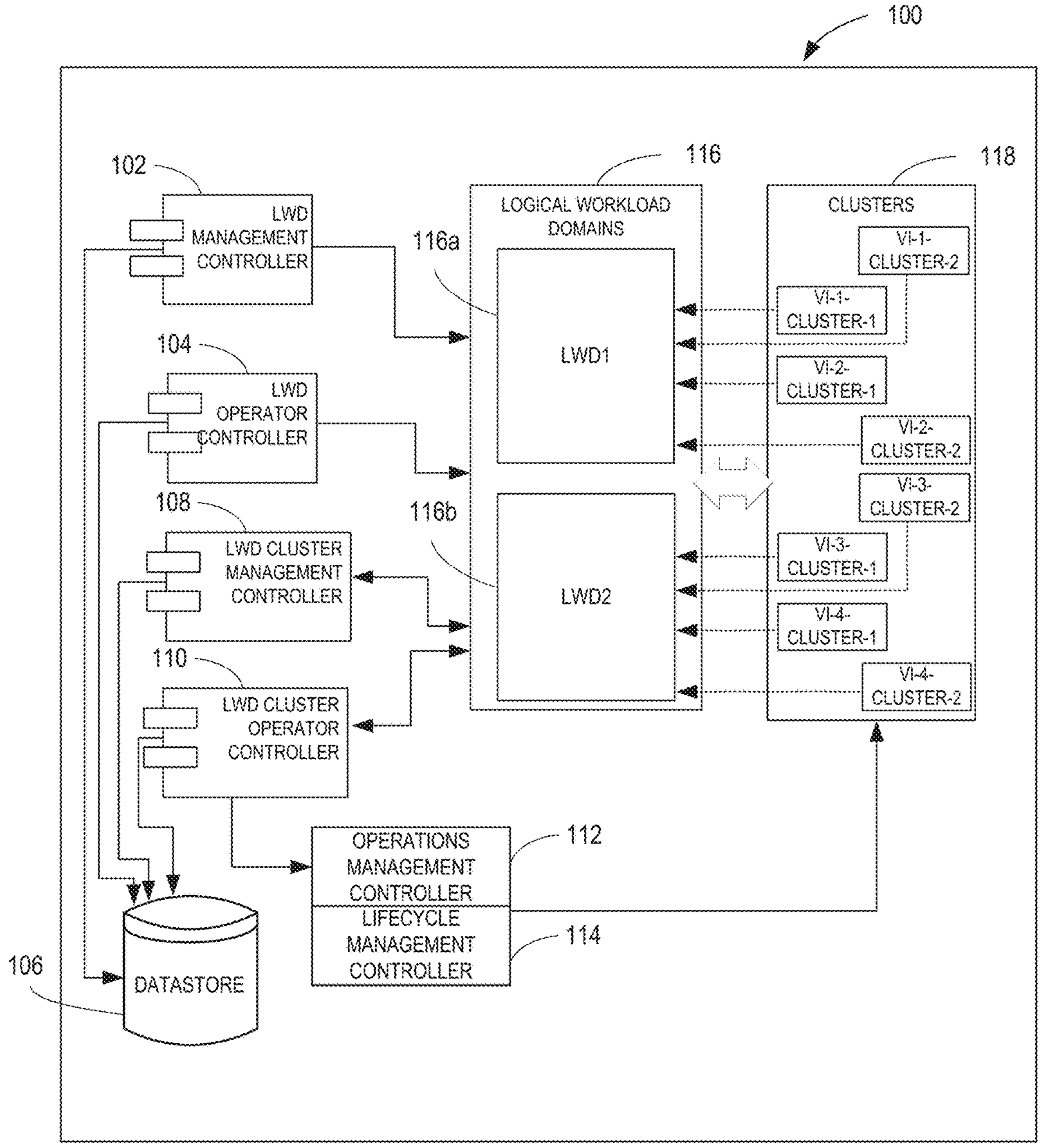
FIG. 1 is a block diagram of an example logical workload domain (LWD) system in which an example LWD cluster management controller and an example LWD cluster operator controller operates to manage LWD clusters.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly within the context of the discussion (e.g., within a claim) in which the elements might, for example, otherwise share a same name.

As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

As used herein, "programmable circuitry" is defined to include (i) one or more special purpose electrical circuits (e.g., an application specific circuit (ASIC)) structured to perform specific operation(s) and including one or more semiconductor-based logic devices (e.g., electrical hardware implemented by one or more transistors), and/or (ii) one or more general purpose semiconductor-based electrical circuits programmable with instructions to perform specific functions(s) and/or operation(s) and including one or more semiconductor-based logic devices (e.g., electrical hardware implemented by one or more transistors). Examples of programmable circuitry include programmable microprocessors such as Central Processor Units (CPUs) that may execute first instructions to perform one or more operations and/or functions, Field Programmable Gate Arrays (FPGAs) that may be programmed with second instructions to cause configuration and/or structuring of the FPGAs to instantiate one or more operations and/or functions corresponding to the first instructions, Graphics Processor Units (GPUs) that may execute first instructions to perform one or more operations and/or functions, Digital Signal Processors (DSPs) that may execute first instructions to perform one or more operations and/or functions, XPUs, Network Processing Units (NPUs) one or more microcontrollers that may execute first instructions to perform one or more operations and/or functions and/or integrated circuits such as Application Specific Integrated Circuits (ASICs). For example, an XPU may be implemented by a heterogeneous computing system including multiple types of programmable circuitry (e.g., one or more FPGAs, one or more CPUs, one or more GPUs, one or more NPUs, one or more DSPs, etc., and/or any combination(s) thereof), and orchestration technology (e.g., application programming interface(s) (API(s)) that may assign computing task(s) to whichever one(s) of the multiple types of programmable circuitry is/are suited and available to perform the computing task(s).

As used herein integrated circuit/circuitry is defined as one or more semiconductor packages containing one or more circuit elements such as transistors, capacitors, inductors, resistors, current paths, diodes, etc. For example an integrated circuit may be implemented as one or more of an ASIC, an FPGA, a chip, a microchip, programmable circuitry, a semiconductor substrate coupling multiple circuit elements, a system on chip (SoC), etc.

DETAILED DESCRIPTION

In computing environments, clusters of computing devices can be deployed to provide redundancy and distribute compute resources across multiple physical devices. In some implementations, multiple host computing systems can be deployed and each host computing system can provide a physical platform for virtual machines, containers, or other virtualized endpoints. The hosts may further provide additional compute resources, including virtual networking, including routing, encapsulation, or other similar networking operations to support the communications of the virtual endpoints. In some examples, an organization may deploy multiple physical clusters, and each of the clusters may include a plurality of hosts. The clusters may be deployed in a single datacenter or can be deployed across multiple datacenters, edge deployments (stores, workplaces, and the like), and geographic locations.

An SDDC environment typically requires configuration of compute resources, network resources, storage resources, and security protocols. An SDDC executes workload domains in accordance with resource configurations (e.g., configurations of clusters and corresponding hosts) corresponding to these workload domains. As used herein, a workload domain is a policy-based resource container with specific availability and/or performance attributes that combines virtual compute resources, virtual storage resources, and/or virtual network resources into a useable execution environment. In examples disclosed herein, a workload domain is deployed in a virtualization environment and used to execute deployed applications.

In some examples, an SDDC environment includes, manages, and deploys a plurality of workload domains. In such examples, at least some, if not all, of the plurality of workload domains are homogenous. As used herein, homogeneous workload domains are that workload domains share the same hardware and/or virtual resources (e.g., servers, memory, etc.). For example, when a first workload domain is created for an SDDC to deploy and manage, the first workload domain is assigned to a set of one or more servers (e.g., physical and/or virtual servers) that are managed by the SDDC. When a second workload domain is created for the SDDC to deploy and manage, the second workload domain is also assigned to the set of one or more servers (e.g., physical and/or virtual). In this example, the first and second workload domains may have separate functions (e.g., execute different applications), but they utilize the same compute resources. As such, the first and second workload domains are homogenous workload domains. In some examples, the first and second workload domains may operate in conjunction with each other. The operation of the individual workload domains is determined by a user creating a virtual environment and, thus, may function in any way desired and known by the user. In some examples, when there are 10, 20, 50, 100, or any number of workload domains deployed by the SDDC, it becomes cumbersome to manage. For example, updating policies of the SDDC, updating firmware versions, etc., may take a significant amount of time to perform, because every individual workload domain will require the updates.

Additionally, there is an even greater number of clusters and hosts managed by the SDDC when a large number of workload domains are deployed by the SDDC. For example, a workload domain includes one or more clusters. And a cluster includes one or more hosts. Therefore, for a given workload domain, there may be tens to hundreds of hosts. While previous solutions to manage, as one unit, such a large number of resources included grouping workload domains into logical workload domains (LWDs), such solutions did not cover managing, as one unit, the clusters and associated hosts included in the workload domains. For example, a user and/or operator of a workload domain could apply firmware updates, security policy updates, certificate management, etc. at a LWD level, but not at a cluster and/or host level. Therefore, users and/or operators could not apply configuration management, desired state management, lifecycle updates, etc., to hosts in a uniform manner. For example, when hosts were to be updated, a user and/or operator had to apply the update manually to one host at a time.

As used herein, "moving hosts," "assigning hosts," and/or "distributing hosts" refers to a process of reallocating hosts. In virtual computing, hosts can be reallocated to different clusters through a process known as live migration or live relocation. Live migration allows for the movement of virtual machines (VMs) from one physical host to another without disruption to running (e.g., operating) applications. As used herein, a "LWD" is a logical grouping of two or more workload domains based on a certain criterion. As used herein, a "cluster" is a cluster of two or more hosts (e.g., computing devices, computing systems, compute resources, etc.) deployed to provide redundancy, distribute compute resources across multiple physical devices, and/or provide physical platforms for virtual machines, containers, and/or other virtual endpoints.

Examples disclosed herein define a logical workload domain cluster (LWDC) as a logical grouping of two or more of workload domains and corresponding clusters based on criterion. In some examples, the LWDC provides a user and/or operator the ability to manage hosts and/or clusters at a LWD level. In some examples, the LWDC provides a user and/or operator the ability to apply a desired state configuration across clusters to have a similar set of configurations on a cluster level. In some examples, such a desired state configuration normalizes a standard across workload domains. In some examples, the LWDC facilitates an automatic resource optimization of hosts operating under and/or in a LWD. For example, examples disclosed herein identify hosts from one workload that are available (e.g., not in use, have a threshold amount of available storage, have a threshold amount of available processing capabilities, etc.) and assign (e.g., move, reallocate, etc.) them to a different workload of the same LWD, when the different workload has a critical situation due to the shortage and/or overuse of its resources (e.g., a resource crunch).

As used herein, a "desired state configuration" refers to how a user and/or operator wants to set up the host and/or cluster. For example, a desired state configuration of a host may be a specific profile created by a user and/or operator. In some examples, a profile and/or a desired state configuration is created utilizing a template (e.g., a configuration template). In some examples, such templates are pre-defined by a provider (e.g., VMware Inc.) or a user/operator. For example, when a user and/or operator wishes to create a virtual infrastructure (VI) type workload domain, the user and/or operator can retrieve a template that can be used to configure hosts to operate specifically for a VI. In such an example, the template may be created by a provider, by the user/operator at a previous time, etc.

FIG. 1 is a block diagram of an example logical workload domain (LWD) system 100 to create and manage logical workload domain clusters (LWDC). The example LWD system 100 includes an example logical workload domain (LWD) management controller 102, an example logical workload domain (LWD) operator controller 104, an example datastore 106, an example LWD cluster management controller 108, an example LWD cluster operator controller 110, an example operations management controller 112, an example lifecycle management (LCM) controller 114, example logical workload domains (LWD) 116*a*, 116*b*, and 116*c*, collectively LWDs 116, and example clusters 118.

The example LWD system 100 is a system that operates on top of or outside of one or more virtual server racks. The example LWD system 100 is a high-level management system that facilitates the creation of LWDs 116 and that facilitates the management of both the LWDs 116 and clusters 118. For example, the LWD system 100 includes components that configure resources, facilitate updates, configure security protocols, etc. For example, the LWD system 100 configures, deploys, and/or upgrades logical workload domains 116. In addition, the example LWD system 100 configures, deploys, upgrades, moves, etc. the example clusters 118. In addition, the example LWD system 100 may be implemented by a physical server, a virtual server, and/or a combination thereof.

The example LWD system 100 includes the example LWD management controller 102 to configure and/or deploy LWDs 116. The example LWD management controller 102 includes at least one read/write connection that may be connected to a network to receive API calls. For example, the LWD management controller 102 communicates with an SDDC manager, controlled by a user, to create LWDs 116, remove LWDs 116, etc. In the illustrated example, the LWD management controller 102 is to retrieve reference configuration templates from the datastore 106 and/or configure the LWDs 116 based on settings of the retrieved reference configuration templates. The example LWD management controller 102 selects a reference configuration template based on instructions from API calls. The example LWD management controller 102 may select a reference configuration template based on a type (e.g., a banking type, a web server type, a media streaming type, etc.) of the application to be deployed in the workload domain and/or based on the LWD 116 to which the workload domain is to belong, which may be determined based on user input. In some examples, the LWD management controller 102 is instantiated by programmable circuitry executing LWD management controller instructions and/or configured to perform operations such as those represented by the flowchart of FIG. 4.

In some examples, the LWD domain system 100 includes means for configuring and deploying LWDs. For example, the means for configuring and deploying LWDs may be implemented by LWD management controller circuitry such as the LWD management controller 102. In some examples, the LWD management controller 102 may be instantiated by programmable circuitry such as the example programmable circuitry 812 of FIG. 8. For instance, the LWD management controller 102 may be instantiated by the example microprocessor 900 of FIG. 9 executing machine executable instructions such as those implemented by at least blocks 402, 404, 406, 408, 410, 412, 414, 416, 418, 420, 422, 424, 426, 428, 430, and 432 of FIG. 4. In some examples, LWD management controller 102 may be instantiated by hardware logic circuitry, which may be implemented by an ASIC, XPU, or the FPGA circuitry 1000 of FIG. 10 configured and/or structured to perform operations corresponding to the machine readable instructions. Additionally or alternatively, the LWD management controller 102 may be instantiated by any other combination of hardware, software, and/or firmware. For example, the LWD management controller 102 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) configured and/or structured to execute some or all of the machine readable instructions and/or to perform some or all of the operations corresponding to the machine readable instructions without executing software or firmware, but other structures are likewise appropriate.

The example LWD system 100 includes the example LWD operator controller 104 to apply policies and/or to update deployed LWDs 116. For example, the LWD operator controller 104 facilitates applying security policies, managing upgrades, performing backup and restore operations, and applying compliance updates at the LWD level. The example LWD operator controller 104 can simultaneously and/or concurrently orchestrate a service for all workload domains within a LWD 116 and, thus, decrease an amount of time spent on orchestrating the service to individual workload domains. As used herein, orchestrating is defined as the creation, management, manipulation and/or decommissioning of cloud resources, (e.g., computing, storage, and/or networking resources), in order to realize customer computing requests (e.g., processing requests, hosting requests, etc.), while conforming to operational objectives of cloud service providers. Orchestrating a service includes managing, manipulating, and/or decommissioning cloud resources corresponding to one or more logical workload domains (e.g., the cloud resources making up the logical workload domains) in order to instantiate (e.g., realize) the service.

In some examples, the LWD system 100 includes means for applying policies to LWDs. For example, the means for applying policies to LWDs may be implemented by LWD operator controller circuitry such as the LWD operator controller 104. In some examples, the LWD operator controller 104 may be instantiated by programmable circuitry such as the example programmable circuitry 812 of FIG. 8. For instance, the LWD operator controller 104 may be instantiated by the example microprocessor 900 of FIG. 9 executing machine executable instructions. In some examples, LWD operator controller 104 may be instantiated by hardware logic circuitry, which may be implemented by an ASIC, XPU, or the FPGA circuitry 1000 of FIG. 10 configured and/or structured to perform operations corresponding to the machine readable instructions. Additionally or alternatively, the LWD operator controller 104 may be instantiated by any other combination of hardware, software, and/or firmware. For example, the LWD operator controller 104 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) configured and/or structured to execute some or all of the machine readable instructions and/or to perform some or all of the operations corresponding to the machine readable instructions without executing software or firmware, but other structures are likewise appropriate.

The example LWD system 100 includes the example datastore 106 which includes and/or stores reference configuration templates (workload domain configuration templates) and/or cluster assignments. Reference configuration templates provide configuration settings for the workload domains. As used herein, a configuration template is a data file that stores general configuration settings for workload domains. In examples disclosed herein, the configuration templates are used by the LWD management controller 102 to initially configure the workload domains and LWDs. Multiple configuration templates with different settings may be provided for different workload domains such as, for example, a workload domain for using a banking application, a workload domain for using a streaming service application, etc. In some examples, the reference configuration templates include metadata indicative of ones of logical workload domains 116*a*, 116*b* to which the reference configuration templates correspond. For example, a first reference configuration template may be a replica of a workload domain in a first LWD 116*a* and a second reference configuration template may be a replica of a workload domain in a second LWD 116*b*. The cluster assignments stored in the example datastore 106 are indicative of which clusters 118 are associated with what LWD 116. In some examples, the LWD management controller 102 generates the cluster assignments.

The example datastore 106 of this example may be implemented by a volatile memory (e.g., a Synchronous Dynamic Random Access Memory (SDRAM), Dynamic Random Access Memory (DRAM), RAMBUS Dynamic Random Access Memory (RDRAM), etc.) and/or a non-volatile memory (e.g., flash memory). The example datastore 106 may additionally or alternatively be implemented by one or more double data rate (DDR) memories, such as DDR, DDR2, DDR3, DDR4, mobile DDR (mDDR), etc. The example datastore 106 may additionally or alternatively be implemented by one or more mass storage devices such as hard disk drive(s), compact disk (CD) drive(s), digital versatile disk (DVD) drive(s), solid-state disk drive(s), etc. While in the illustrated example the datastore 106 is illustrated as a single datastore, the datastore 106 may be implemented by any number and/or type(s) of datastores. Furthermore, the data stored in the example datastore 106 may be in any data format such as, for example, binary data, comma delimited data, tab delimited data, structured query language (SQL) structures, etc.

The example LWD system 100 includes the example LWD cluster management controller 108 to monitor resource utilization across clusters 118 and manage (e.g., reallocate, move, change, extend, etc.) the clusters 118 based on feedback from resource utilization monitoring. For example, the LWD cluster management controller 108 performs cluster movement between workload domains in a LWD 116 and/or host movement between clusters 118 in a LWD 116 based on resource utilization. An example of cluster movement and host movement is described in further detail below in connection with the clusters 118 and in connection with FIG. 2. In some examples, the LWD cluster management controller 108 executes an automatic resource optimization operation to the clusters 118. Such an example automatic resource optimization operation is also described in further detail below in connection with FIG. 2.

The example LWD system 100 includes the example LWD cluster operator controller 110 to orchestrate operational processes on clusters 118 at a logical domain cluster level. For example, the LWD cluster operator controller 110 triggers upgrades across hosts in a LWD 116, applies desired state configurations on clusters in a LWD 116, triggers certificate management across hosts in a LWD 116 and/or across selected clusters in a LWD 116, applies security and password policies across clusters in a LWD 116, etc. In some examples, the LWD cluster operator controller 110 improves the efficiency of orchestrating the day-to-day infrastructure operations of one or more workload domains by issuing one operation instruction for all the clusters as opposed to an operation instruction for each cluster. The example LWD cluster operator controller 110 is described in further detail below in connection with FIG. 3.

The example LWD system 100 includes the example operations management controller 112 to perform individual operations on individual clusters when a cluster does not belong to a LWD. For example, some workload domains may not be configured to be included in a group of workload domains (e.g., logical workload domains) and, thus, the corresponding clusters are not configured to be included in a group of clusters (e.g., logical workload domain clusters). As such, the example operations management controller 112 is provided to apply operations to the clusters not included in a LWD. In some examples, the LWD cluster operator controller 110 may receive a request from an SDDC manager to perform an operation on cluster n, and further determine that the cluster n is not included in any LWD. In such examples, the LWD cluster operator controller 110 initiates the operations management controller 112 to perform the operation on the cluster n.

The example LWD system 100 includes the example lifecycle management controller 114 to perform individual upgrades on individual clusters when a cluster does not belong to a LWD. The example lifecycle management controller 114 obtains requests and/or instructions from the LWD cluster operator controller 110 to apply upgrades to clusters. In some examples, the LWD cluster operator controller 110 may receive a request from an SDDC manager to upgrade a cluster n, and further determine that the cluster n is not included in any LWD. In such examples, the LWD cluster operator controller 110 initiates the lifecycle management controller 114 to upgrade the cluster n.

The example LWD system 100 includes the example LWDs 116, which are one or more logical groupings of a number of workload domains and corresponding clusters of resources (e.g., hosts) grouped based on certain criteria. In some examples, the criteria/criterion for grouping is based on applications that are to run on the workload domains' clusters. For example, workload domains utilized for a banking application may be grouped together, workload domains used for a streaming service application may be grouped together, etc. In some examples, the criteria/criterion for grouping is based on user choices. For example, if a user wants particular workload domains and/or clusters to be handled simultaneously and/or concurrently (e.g., managed at one time), the user can select which workload domains to group together.

The example LWD system 100 includes the example clusters 118, which represent a cluster of hosts assigned to a workload. For example, a first workload domain (VI-1) includes a first cluster (VI-1-CLUSTER-1) and a second cluster (VI-1-CLUSTER-2). In this example, the first cluster and the second cluster are assigned to the first workload domain and, thus, the clusters of hosts perform tasks, operations, etc., for the first workload domain. The hosts represent physical computers, which can each include memory and at least one processing system to provide the operations disclosed herein. A cluster may utilize any number of hosts. In some examples, the clusters 118 can be deployed by an organization to provide resources for virtual endpoints, including virtual machines, containers, and the like. In some examples, the hosts can virtualize the physical resources or components to virtual or logical resource representations and provide access to the virtual or logical resource representation of the physical resources to the virtual machines or other virtualized endpoints. The resources can include processing resources, memory resources, networking resources, and the like. The organization may deploy one or more clusters 118 within the same datacenter or across multiple datacenters in different geographic locations. These locations can be remote or moveable, such as retail locations, cruise ships, oil rigs, or other similar deployments of hosts for virtual machines.

In FIG. 1, the LWD system 100 includes an example deployment of clusters and LWDs. For example, the LWD system 100 includes a deployment of a first LWD 116*a* and a second LWD 116*b*. The example first LWD 116*a* includes the first cluster (VI-1-CLUSTER-1) and the second cluster (VI-1-CLUSTER-2) from the first workload domain (VI-1), and a third cluster (VI-2-CLUSTER-1) and a fourth cluster (VI-2-CLUSTER-2) from a second workload domain (VI-2). The example second LWD 116*b* includes a fifth cluster (VI-3-CLUSTER-1) and a sixth cluster (VI-3-CLUSTER-2) from a third workload domain (VI-3), and a seventh cluster (VI-4-CLUSTER-1) and an eighth cluster (VI-4-CLUSTER-2) from a fourth workload domain (VI-4).

In the illustrated example of FIG. 1, there are two LWDs (e.g., 116*a* and 116*b*) that constitute four workload domains and eight clusters. In some examples, when a particular generation of hardware is added to a data center (e.g., a location that houses core information technology and computing services and infrastructure), there are n same generations of servers added to a cloud management instance (e.g., VMware Cloud Foundation®). In such examples, the cloud management instance includes an SDDC and the example LWD system 100. As such, the n same generations of servers are deployed as two workload domains (e.g., as workload domain 1 (VI-1) and workload domain 2 (VI-2)), where the resources of the servers are deployed as clusters of resources operating for the two workload domains. These two workload domains, and associated clusters, would require firmware updates at the same or similar times, lifecycle upgrades at the same time, etc. Therefore, these two workload domains, and associated clusters, can be grouped by the LWD management controller 102 and deployed together as the first LWD 116*a*. The example LWD system 100 groups the two workload domains together as the first LWD 116*a* so that baselining and management of the n servers can be handled in one place.

In some examples, another deployment of a group of workload domains is configured to follow the same security policy for all of its workload domains. In some examples, when a user configures workload domains to follow the same security policy, the LWD management controller 102 can identify this criteria and group the workload domains into a LWD. For example, the second LWD 116*b* includes workload domain 3 (VI-3) and workload domain 4 (VI-4), which are both configured to follow the same security policy. Therefore, the second LWD 116*b* is created based on the security policy criteria. By creating the second LWD 116*b* based on the security policy, the example LWD operator controller 104 is enabled to configure updates and security policies in one place instead of configuring two workload domains separately. In some examples, the LWD cluster operator controller 110 is enabled to configure updates and security policies in one place instead of configuring four clusters separately (e.g., clusters VI-3-CLUSTER-1, VI-3-CLUSTER-2, VI-4-CLUSTER-1, VI-4-CLUSTER-2).

In some examples, as described above, the LWD cluster management controller 108 performs cluster movement between workload domains in a LWD 116 and/or host movement between clusters 118 in a LWD 116 based on resource utilization. In such an example, the LWD cluster management controller 108 can move the second cluster (VI-1-CLUSTER-2) from the first workload domain (VI-1) to the second workload domain (VI-2), due to their logical grouping (e.g., being grouped together in LWD 116*a*). In this example, the second cluster comes under the control of the second workload domain (VI-2), along with the third cluster (VI-2-CLUSTER-1) and the fourth cluster (VI-2-CLUSTER-2). In some examples, LWD cluster management controller 108 moves the second cluster from workload domain 1 to workload domain 2 because workload domain 2 has a resource crunch (e.g., a critical situation due to the shortage and/or overuse of the workload domain resources). In some examples, the LWD cluster management controller 108 can move a host from the first cluster (VI-1-CLUSTER-1) to the second cluster (VI-1-CLUSTER-2). For example, if the second cluster has a resource crunch, and the first cluster has an available host, the LWD cluster management controller 108 can configure the available host to operate for the second cluster. The host and cluster movement is described in further detail below in connection with FIG. 2.

In some examples, the LWD management controller 102 is configured to group the workload domain based on application criteria. As such, the example workload domain 3 (VI-3) and the example workload domain 4 (VI-4) execute parts of the same application. The example LWD management controller 102 may analyze configuration settings of the workload domains to determine that workload domain 3 (VI-3) and workload domain 4 (VI-4) execute parts of the same application. In some examples, the configuration settings include a job title of the workload domain. For example, both the workload domain 3 (VI-3) and workload domain 4 (VI-4) include information indicating their job title is JOB 1. The example LWD management controller 102 creates the second LWD 116*b* to be consumed as a resource for JOB 1. For example, the LWD management controller 102 encloses the set of workload domains (e.g., workload domain 3 (VI-3) and workload domain 4 (VI-4)) in the second LWD 116*b* as a set of workload domains that can be managed together as a single entity.

Figure 2:
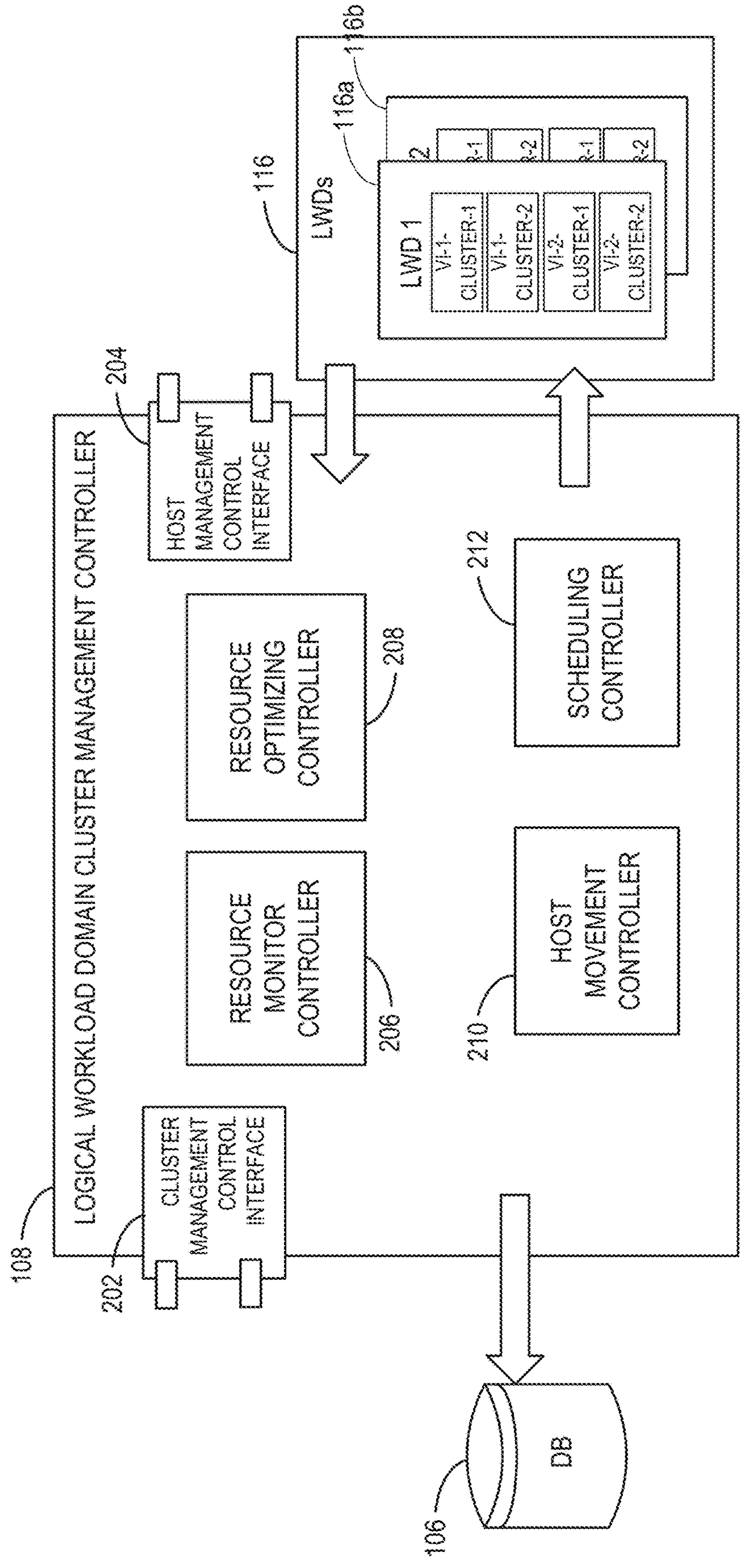
FIG. 2 is a block diagram of an example implementation of the LWD cluster management controller of FIG. 1.

FIG. 2 is a block diagram of an example implementation of the LWD cluster management controller 108 of FIG. 1 to monitor resource utilization across clusters 118 and manage (e.g., reallocate, move, change, extend, etc.) the clusters 118 based on feedback from resource utilization monitoring. The example LWD cluster management controller 108 of FIG. 2 may be instantiated (e.g., creating an instance of, bring into being for any length of time, materialize, implement, etc.) by programmable circuitry such as a Central Processor Unit (CPU) executing first instructions. Additionally or alternatively, the example LWD cluster management controller 108 of FIG. 2 may be instantiated (e.g., creating an instance of, bring into being for any length of time, materialize, implement, etc.) by (i) an Application Specific Integrated Circuit (ASIC) and/or (ii) a Field Programmable Gate Array (FPGA) structured and/or configured in response to execution of second instructions to perform operations corresponding to the first instructions. It should be understood that some or all of the circuitry of FIG. 2 may, thus, be instantiated at the same or different times. Some or all of the circuitry of FIG. 2 may be instantiated, for example, in one or more threads executing concurrently on hardware and/or in series on hardware. Moreover, in some examples, some or all of the circuitry of FIG. 2 may be implemented by microprocessor circuitry executing instructions and/or FPGA circuitry performing operations to implement one or more virtual machines and/or containers.

The example LWD cluster management controller 108 includes an example cluster management control interface 202, an example host management control interface 204, an example resource monitor 206, an example resource optimization controller 208, an example host movement controller 210, and an example scheduling controller 212. In some examples, the resource monitor 206 is instantiated by programmable circuitry executing resource monitor instructions and/or configured to perform operations such as those represented by the flowchart of FIG. 6. In some examples, the resource optimization controller 208 is instantiated by programmable circuitry executing resource optimization circuitry instructions and/or configured to perform operations such as those represented by the flowchart of FIG. 6. In some examples, the host movement controller 210 is instantiated by programmable circuitry executing host movement circuitry instructions and/or configured to perform operations such as those represented by the flowchart of FIG. 6. In some examples, the scheduling controller 212 is instantiated by programmable circuitry executing scheduling circuitry instructions and/or configured to perform operations such as those represented by the flowchart of FIG. 6.

In the illustrated example of FIG. 2, the example LWD cluster management controller 108 includes the cluster management control interface 202 to obtain instructions from an example SDDC manager and/or any type of management platform that enables a user to control cluster movement and resource utilization of clusters. Additionally and/or alternatively, the example cluster management control interface 202 is to send instructions to the example resource monitor 206, the host movement controller 210, and the scheduling controller 212. The instructions communicated by the example cluster management control interface 202 include instructions to monitor resource utilization within a cluster, instructions to automatically optimize resource utilization in a cluster, and instructions to adjust (e.g., expand, reduce, remove, etc.) a stretch cluster. In this example, the cluster management control interface 202 is implemented by a create, read, upload, and delete (CRUD) plugin box. A CRUD plugin box is implemented using an API that enables a program to submit API calls to the CRUD plugin box to create and control workload domains.

In some examples, the LWD cluster management controller 202 includes means for obtaining requests. For example, the means for obtaining requests may be implemented by cluster management control interface 202. In some examples, the cluster management control interface 202 may be instantiated by programmable circuitry such as the example programmable circuitry 812 of FIG. 8. For instance, the cluster management control interface 202 may be instantiated by the example microprocessor 900 of FIG. 9 executing machine executable instructions such as those implemented by at least block 602 of FIG. 6. In some examples, cluster management control interface 202 may be instantiated by hardware logic circuitry, which may be implemented by an ASIC, XPU, or the FPGA circuitry 1000 of FIG. 10 configured and/or structured to perform operations corresponding to the machine readable instructions. Additionally or alternatively, the cluster management control interface 202 may be instantiated by any other combination of hardware, software, and/or firmware. For example, the cluster management control interface 202 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) configured and/or structured to execute some or all of the machine readable instructions and/or to perform some or all of the operations corresponding to the machine readable instructions without executing software or firmware, but other structures are likewise appropriate.

In the illustrated example of FIG. 2, the example LWD cluster management controller 108 includes the example host management control interface 204 to obtain instructions from the example host movement controller 210. Additionally and/or alternatively, the example host management control interface 204 provides instructions to clusters (e.g., clusters 118) and hosts. In this example, the host management control interface 204 is implemented by a create, read, upload, and delete (CRUD) plugin box. The CRUD plugin box is implemented using an API that enables a program to submit API calls to the CRUD plugin box to manage hosts.

In some examples, the LWD cluster management controller 108 includes means for obtaining second requests. For example, the means for obtaining second requests may be implemented by host management control interface circuitry such as the host management control interface 204. In some examples, the host management control interface 204 may be instantiated by programmable circuitry such as the example programmable circuitry 812 of FIG. 8. For instance, the host management control interface 204 may be instantiated by the example microprocessor 900 of FIG. 9 executing machine executable instructions. In some examples, the host management control interface 204 may be instantiated by hardware logic circuitry, which may be implemented by an ASIC, XPU, or the FPGA circuitry 1000 of FIG. 10 configured and/or structured to perform operations corresponding to the machine readable instructions. Additionally or alternatively, the host management control interface 204 may be instantiated by any other combination of hardware, software, and/or firmware. For example, the host management control interface 204 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) configured and/or structured to execute some or all of the machine readable instructions and/or to perform some or all of the operations corresponding to the machine readable instructions without executing software or firmware, but other structures are likewise appropriate.

In the illustrated example of FIG. 2, the example LWD cluster management controller 108 includes the example resource monitor 206 to monitor resource usage of the example clusters (e.g., clusters 118 of FIG. 1). For example, the resource monitor 206 collects data from the hosts, underlying hardware, hypervisors, VMs, etc. that provide insights into resource utilization, performance metrics, and/or overall health of a virtual infrastructure. The example resource monitor 206 obtains the data utilizing an API. For example, the resource monitor 206 utilizes the host management control interface 204 that allows for a collection of performance data from hosts, hypervisors, VMs, etc. For example, the host management control interface 204 may implement and/or access an API that obtains detailed information about the clusters 118. In some examples, the resource monitor 206 is a monitoring tool that has access to and/or authorization to use such APIs to obtain detailed information about the clusters. For example, the resource monitor 206 may trigger or send an instruction to the host management control interface 204 to obtain resource usage data from the hosts in the clusters 118. Additionally or alternatively, the clusters 118 may have software agents deployed at each host which continuously gather data about CPU usage, memory usage, disk I/O, network traffic, and other performance metrics. Such agents then send this data to the resource monitor 206, via the host management control interface 204, for analysis and reporting. Additionally or alternatively, the hosts in the clusters 118 are configured to support simple network management protocol (SNMP) which enables the example resource monitor 206 to query hosts for resource utilization and performance data. Additionally or alternatively, the hosts in the clusters 118 generate log files containing information about resource usage and system events. In such an example, the resource monitor 206 can analyze these log files to identify resource usage. The example resource monitor 206 can use any suitable method for collecting and/or obtaining resource usage data about the clusters 118 and associated hosts.

In some examples, the resource monitor 206 performs a resource usage analysis on the collected resource usage data to determine whether a cluster is in a low resource state due to the shortage and/or overuse of its resources. As used herein, a low resource state of a cluster refers to a cluster that includes hosts operating at a high capacity, such as using most (or all) of their storage, CPU cycles, bandwidth, etc. In some examples, the resource monitor 206 is provided with pre-defined threshold values for each low resource state metric (e.g., CPU usage, memory utilization, disk input/output (I/O), network traffic, and storage capacity). These pre-defined threshold values, referred to herein as crunch thresholds, represent the upper limits or abnormal conditions beyond which a resource crunch might occur. In examples disclosed herein, a resource crunch occurs when resources of a system (e.g., a workload domain, a cluster, etc.) become overloaded such that they are "crunched" under the resource-intensive use of their tasks. For example, high CPU usage, low free memory, or excessive disk latency could indicate a resource crunch. In another example, a crunch threshold could be assigned to a cluster. A crunch threshold value may be set by a system administrator or an intelligent computer process to represent when a cluster is overloaded. In some examples, the system administrator (or intelligent computer process) defines when a cluster is overloaded. For example, a system administrator can set a crunch threshold value to be higher for a first cluster relative to a second cluster, because the system administrator may desire the first cluster to use less resources than the second cluster. In one example, the first cluster (VI-1-CLUSTER-1) may have a crunch threshold of 60%, indicating that a 60% resource usage or higher by the first cluster is abnormal or an upper limit, while the second cluster (VI-1-CLUSTER-2) may have a crunch threshold of 90%, indicating that a 90% resource usage or higher by the second cluster is abnormal or an upper limit. The example resource monitor 206 utilizes the crunch threshold(s) to determine whether a cluster has a resource crunch. For example, the resource monitor 206 compares the resource usage data to a crunch threshold. For example, the first cluster (VI-1-CLUSTER-1) has a crunch threshold of 60%. In such an example, the resource monitor 206 compares the resource usage (e.g., denoted by a percentage) to the crunch threshold to determine whether the VI-1-CLUSTER-1 is in a critical situation. In some examples, each cluster has a different crunch threshold based on the type of application it is configured to execute, based on the type of workload domain it is deployed in, based on the type of hardware it abstracts and/or operates on, etc. Additionally or alternatively, each cluster has the same crunch threshold. In any event, the example resource monitor 206 is provided the crunch threshold for the clusters 118 in a LWD 116 and uses it to identify resource crunches in one or more clusters.

In some examples, the LWD cluster management controller 108 includes means for obtaining resource usage data. For example, the means for obtaining resource usage data may be implemented by resource monitor circuitry such as the resource monitor 206. In some examples, the resource monitor 206 may be instantiated by programmable circuitry such as the example programmable circuitry 812 of FIG. 8. For instance, the resource monitor 206 may be instantiated by the example microprocessor 900 of FIG. 9 executing machine executable instructions. In some examples, resource monitor 206 may be instantiated by hardware logic circuitry, which may be implemented by an ASIC, XPU, or the FPGA circuitry 1000 of FIG. 10 configured and/or structured to perform operations corresponding to the machine readable instructions such as those implemented by at least blocks 608, 610, 612, and 614 of FIG. 6. Additionally or alternatively, the resource monitor 206 may be instantiated by any other combination of hardware, software, and/or firmware. For example, the resource monitor 206 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) configured and/or structured to execute some or all of the machine readable instructions and/or to perform some or all of the operations corresponding to the machine readable instructions without executing software or firmware, but other structures are likewise appropriate.

In the illustrated example of FIG. 2, the example LWD cluster management controller 108 includes the example resource optimization controller 208 to optimize a usage of resources across clusters 118. In some examples, the resource optimization controller 208 is provided with pre-defined availability threshold values indicative of a resource availability of a cluster. As used herein, an availability threshold is set to represent a level of resource non-usage (e.g., idle resources, idle resource capacity, etc.) that is available for use through reallocation of the non-used resource portion. The availability threshold can be set by a system administrator or an intelligent computer-implemented process based on, for example, a type of application running on the cluster (e.g., whether the cluster is executing a high priority application, a low priority application, etc.), the type of hosts in the cluster (e.g., whether the host has processors including multiple cores or a single core, whether the host includes accelerators, etc.), etc. In some examples, the resource optimization controller 208 utilizes the availability threshold to determine which cluster has available hosts that can be used to reduce a crunch of a cluster in a low resource state. For example, an organization or an administrator may configure the second cluster (VI-1-CLUSTER-2) to have an availability threshold of twenty percent (20%). In such an example, the resource optimization controller 208 compares resource usage of VI-1-CLUSTER-2 (e.g., obtained from the resource monitor 206) to the 20% availability threshold to determine whether the resource usage of VI-1-CLUSTER-2 is 20% or less. When the resource optimization controller 208 determines VI-1-CLUSTER-2 resource usage is less than or equal to 20%, the resource optimization controller 208 can send a notification and/or a message indicating that VI-1-CLUSTER-2 has available hosts (e.g., hosts available to be moved for a cluster under a resource crunch). In some examples, the resource optimization controller 208 repeats a comparison of resource usage data to availability thresholds for all clusters in a LWD 116 to identify a source cluster with the highest availability. For example, if the resource usage of VI-1-CLUSTER-2 is 18% with a 20% availability threshold, but resource usage of VI-1-CLUSTER-1 is 5% with a 21% availability threshold, then the resource optimization controller 208 selects VI-1-CLUSTER-1 has the source cluster.

In some examples, the resource optimization controller 208 triggers host movement. For example, the resource optimization controller 208 sends an instruction and/or request to the host movement controller 210, where the instruction includes information relating to which cluster and host is to be reallocated (e.g., the source cluster) and to which cluster the host is to be reallocated to (e.g., the destination cluster). In some examples, the resource optimization controller 208 obtains feedback from the host movement controller 210. For example, the host movement controller 210 notifies the resource optimization controller 208 when reallocation of a host is complete. In some examples, upon a notification from the host movement controller 210, the resource optimization controller 208 "recalculates" the resource usage of the both the source cluster and destination cluster. As used herein, "recalculating" resource usage includes collecting resource usage data from the source cluster and destination cluster, after a host has been reallocated, and further comparing the resource usage data to the crunch threshold to determine if there is still a critical situation at the destination cluster. For example, if the resource optimization controller 208 was notified that a host of VI-1-CLUSTER-2, having a resource usage of 20% or less, was reallocated to VI-1-CLUSTER-1, the resource optimization controller 208 would collect resource usage data from both VI-1-CLUSTER-1 and VI-1-CLUSTER-2 and determine whether either of those clusters are in a low resource state. Additionally or alternatively, the resource optimization controller 208 requests the resource monitor 206 to determine whether VI-1-CLUSTER-1 or VI-1-CLUSTER-2 are in a low resource state. In some examples, if the resource optimization controller 208 determines that a cluster (source or destination), after reallocation of a host, is still in (or newly in) a low resource state, the process for identifying an available host is repeated and host reallocation reoccurs.

In some examples, the resource optimization controller 208 optimizes clusters across workload domains. For example, the resource optimization controller 208 can cause a reallocation of clusters within a LWD. In some examples, the resource optimization controller 208 and/or the resource monitor 206 identifies that the first and second clusters (VI-1-CLUSTER-1, VI-1-CLUSTER-2) in workload domain 1 (VI-1) are both in a low resource state. In such an example, the resource optimization controller 208 determines that the third cluster (VI-2-CLUSTER-1) in workload domain 2 (VI-2) does not exceed its availability threshold. Therefore, the example resource optimization controller 208 can cause a reallocation of the third cluster to the workload domain 1 (e.g., VI-2-CLUSTER-1 becomes VI-1-CLUSTER-3). In some examples, the resource optimization controller 208 causes the host movement controller 210 to execute the reallocation of a cluster from one workload domain to another.

In some examples, the resource LWD cluster management controller 108 includes means for optimizing resource usage across clusters. For example, the means for optimizing resource usage across clusters may be implemented by resource optimizing controller circuitry such as the resource optimization controller 208. In some examples, the resource optimization controller 208 may be instantiated by programmable circuitry such as the example programmable circuitry 812 of FIG. 8. For instance, the resource optimization controller 208 may be instantiated by the example microprocessor 900 of FIG. 9 executing machine executable instructions. In some examples, the resource optimization controller 208 may be instantiated by hardware logic circuitry, which may be implemented by an ASIC, XPU, or the FPGA circuitry 1000 of FIG. 10 configured and/or structured to perform operations corresponding to the machine readable instructions such as those implemented by at least blocks 616 and 620 of FIG. 6. Additionally or alternatively, the resource optimization controller 208 may be instantiated by any other combination of hardware, software, and/or firmware. For example, the resource optimization controller 208 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) configured and/or structured to execute some or all of the machine readable instructions and/or to perform some or all of the operations corresponding to the machine readable instructions without executing software or firmware, but other structures are likewise appropriate.

The example LWD cluster management controller 108 includes the example host movement controller 210 to reallocate a host from a source cluster to a destination cluster. The example host movement controller 210 obtains instructions from the example resource optimization controller 208. In some examples, the instructions include information corresponding to the source cluster, the source host, and the destination cluster. To reallocate a source host to a destination cluster, the example host movement controller 210 may reconfigure the destination cluster with information of a source host. For example, specific cluster properties are to be updated to include the moving host (e.g., the source host). In some examples, the host movement controller 210 notifies the resource optimization controller 208 when reconfiguration and, thus, reallocation of a host, is complete.

In some examples, the host movement controller 210 is configured to generate a stretch cluster. As used herein, a stretch cluster refers to a cluster having hosts in two or more availability zones. An availability zone is a collection of infrastructure components that run on a physically distinct, independent infrastructure and is physically separate from a different availability zone. In some examples, a first availability zone is physically separate from a second availability zone when the collection of infrastructure components (e.g., servers, data centers, physical hardware components, etc.) of the first availability zone are located in a different location than the infrastructure components of the second availability zone. For example, first infrastructure components are located at a warehouse and second infrastructure components are located at an office building down the street from the warehouse. In some examples, the host movement controller 210 generates a stretch cluster by moving hosts from a first availability zone to a second availability zone. Availability zones belonging to the same region are configured to have an equal number of hosts to ensure failover in case any of the availability zones goes down (e.g., fails). As used herein, a region is a distinct location where one or more clusters and, thus, workload domains, are located. In some examples, the host movement controller 210 can generate stretch clusters if a LWD is configured based on a particular region. For example, the LWD management controller 102 logically groups together workload domains based on their location. For example, if a first workload domain, a second workload domain, and a third workload domain are deployed in the geographic region (e.g., same city, town, county, etc.), then the LWD management controller 102 can logically group the first, second, and third workload domains based on the location criterion. In such an example, the host movement controller 210 can create availability zones.

In some examples, the LWD cluster management controller 108 includes means for reallocating a host from a source cluster to a destination cluster. For example, the means for reallocating a host from a source cluster to a destination cluster may be implemented by host movement controller circuitry such as the host movement controller 210. In some examples, the host movement controller 210 may be instantiated by programmable circuitry such as the example programmable circuitry 812 of FIG. 8. For instance, the host movement controller 210 may be instantiated by the example microprocessor 900 of FIG. 9 executing machine executable instructions. In some examples, the host movement controller 210 may be instantiated by hardware logic circuitry, which may be implemented by an ASIC, XPU, or the FPGA circuitry 1000 of FIG. 10 configured and/or structured to perform operations corresponding to the machine readable instructions such as those implemented by at least blocks 618 of FIG. 6. Additionally or alternatively, the host movement controller 210 may be instantiated by any other combination of hardware, software, and/or firmware. For example, the host movement controller 210 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) configured and/or structured to execute some or all of the machine readable instructions and/or to perform some or all of the operations corresponding to the machine readable instructions without executing software or firmware, but other structures are likewise appropriate.

The example LWD cluster management controller 108 includes the example scheduling controller 212 to schedule host movement when the LWD cluster management controller 108 operates in an automatic optimization mode. In some examples, the scheduling controller 212 is inactive when an automatic optimization mode is not enabled. The automatic optimization mode is a mode of the LWD cluster management controller 108 that is configured by an organization, user, operator, administrator. The automatic optimization mode causes the resource optimization controller 208 to periodically (e.g., once an hour, once a day, once a week, etc.) execute the optimization process on the clusters in the grouped together in a LWD. As used herein, the optimization process is the process described above in connection with the resource monitor controller 206 and the resource optimization controller 208 and described in further detail below in connection with FIG. 6. In some examples, the optimization process includes obtaining resource usage data for LWD clusters 118, identifying a resource crunch in any ones of the LWD clusters, selecting an available cluster to take a host from, and reallocating the host from the available cluster to any ones of the LWD clusters having a resource crunch.

In some examples, the scheduling controller 212 initiates the optimization process on a periodic basis. For example, the scheduling controller 212 may be configured with a resource check time interval (e.g., 24 hours). In such an example, the scheduling controller 212 waits for the resource check time interval to lapse and then notifies the resource monitor controller 206 to check for LWD clusters having a critical situation. The trigger (e.g., the notification to the resource monitor controller 206) is sent, the resource check time interval resets. In this manner, the example scheduling controller 212 initiates an automatic optimization of resources across all LWD clusters, eliminating a requirement of the user to constantly select an option to optimize the resources.

In some examples, the LWD cluster management controller 108 includes means for scheduling host movement when the LWD cluster management controller 108 operates in an automatic optimization mode. For example, the means for scheduling host movement when the LWD cluster management controller 108 operates in an automatic optimization mode may be implemented by scheduling controller circuitry such as the scheduling controller 212. In some examples, the scheduling controller 212 may be instantiated by programmable circuitry such as the example programmable circuitry 812 of FIG. 8. For instance, the scheduling controller 212 may be instantiated by the example microprocessor 900 of FIG. 9 executing machine executable instructions. In some examples, the scheduling controller 212 may be instantiated by hardware logic circuitry, which may be implemented by an ASIC, XPU, or the FPGA circuitry 1000 of FIG. 10 configured and/or structured to perform operations corresponding to the machine readable instructions such as those implemented by at least blocks 602*a* of FIG. 6. Additionally or alternatively, the scheduling controller 212 may be instantiated by any other combination of hardware, software, and/or firmware. For example, the scheduling controller 212 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) configured and/or structured to execute some or all of the machine readable instructions and/or to perform some or all of the operations corresponding to the machine readable instructions without executing software or firmware, but other structures are likewise appropriate.

While an example manner of implementing the LWD cluster management controller 108 of FIG. 1 is illustrated in FIG. 2, one or more of the elements, processes, and/or devices illustrated in FIG. 2 may be combined, divided, re-arranged, omitted, eliminated, and/or implemented in any other way. Further, the example cluster management control interface 202, the example host management control interface 204, the example resource monitor controller 206, the example resource optimization controller 208, the example host movement controller 210, the example scheduling controller 212, and/or, more generally, the example LWD cluster management controller 108 of FIG. 2, may be implemented by hardware alone or by hardware in combination with software and/or firmware. Thus, for example, any of the cluster management control interface 202, the host management control interface 204, the resource monitor controller 206, the resource optimization controller 208, the host movement controller 210, and/or the scheduling controller 212, and/or, more generally, the example LWD cluster management controller 108, could be implemented by programmable circuitry in combination with machine readable instructions (e.g., firmware or software), processor circuitry, analog circuit(s), digital circuit(s), logic circuit(s), programmable processor(s), programmable microcontroller (s), graphics processing unit(s) (GPU(s)), digital signal processor(s) (DSP(s)), ASIC(s), programmable logic device (s) (PLD(s)), and/or field programmable logic device(s) (FPLD(s)) such as FPGAs. Further still, the example LWD cluster management controller 108 of FIG. 2 may include one or more elements, processes, and/or devices in addition to, or instead of, those illustrated in FIG. 2, and/or may include more than one of any or all of the illustrated elements, processes and devices.

Figure 3:
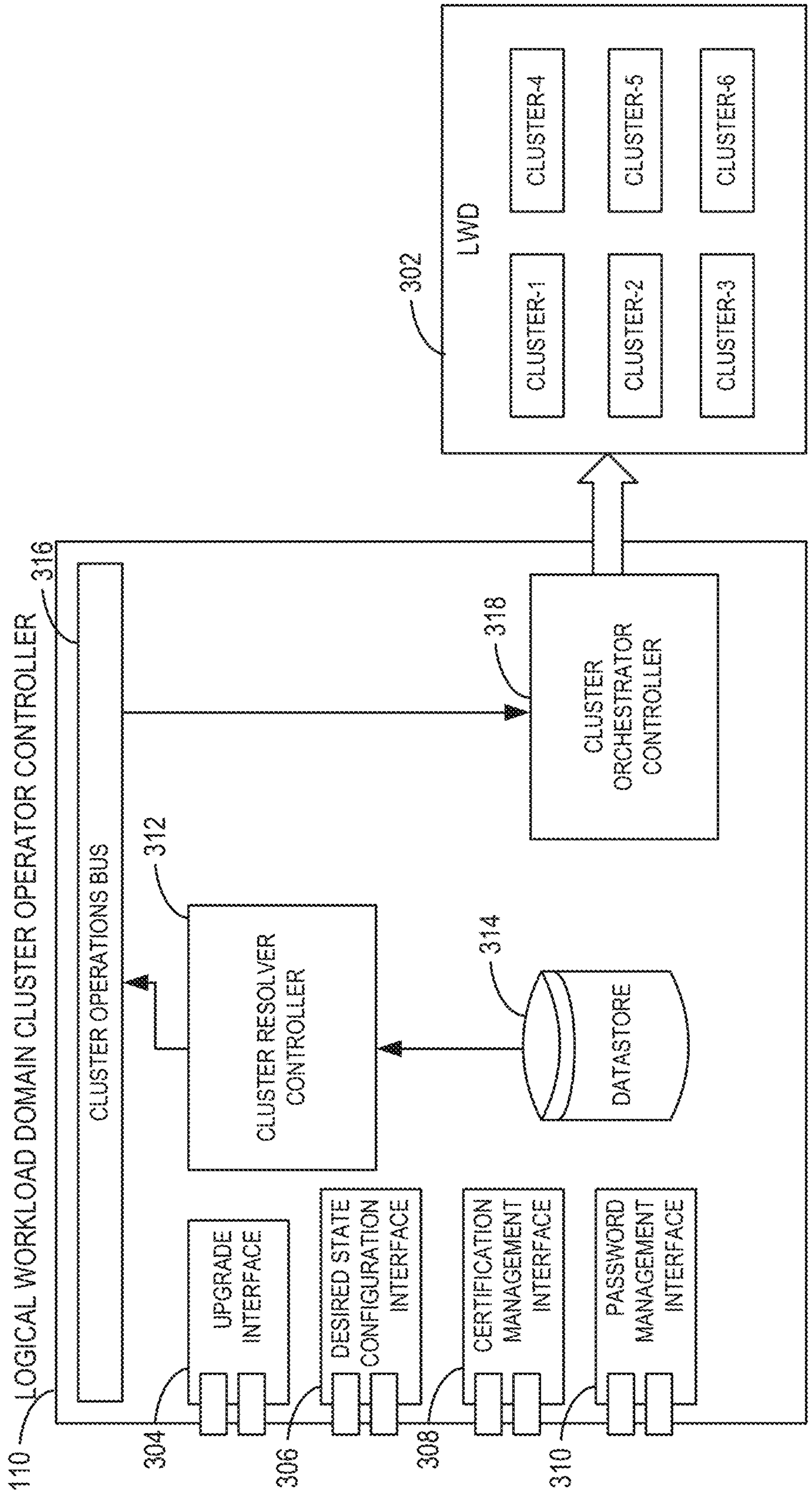
FIG. 3 is a block diagram of an example implementation of the LWD cluster operator controller of FIG. 1.

FIG. 3 is a block diagram of an example implementation of the LWD cluster operator controller 110 of FIG. 1 to onboard LWD clusters and policies and/or updates to deployed LWD clusters. The example LWD cluster operator controller 110 of FIG. 3 may be instantiated (e.g., creating an instance of, bring into being for any length of time, materialize, implement, etc.) by programmable circuitry such as a Central Processor Unit (CPU) executing first instructions. Additionally or alternatively, the example LWD cluster operator controller 110 of FIG. 3 may be instantiated (e.g., creating an instance of, bring into being for any length of time, materialize, implement, etc.) by (i) an Application Specific Integrated Circuit (ASIC) and/or (ii) a Field Programmable Gate Array (FPGA) structured and/or configured in response to execution of second instructions to perform operations corresponding to the first instructions. It should be understood that some or all of the circuitry of FIG. 3 may, thus, be instantiated at the same or different times. Some or all of the circuitry of FIG. 3 may be instantiated, for example, in one or more threads executing concurrently on hardware and/or in series on hardware. Moreover, in some examples, some or all of the circuitry of FIG. 3 may be implemented by microprocessor circuitry executing instructions and/or FPGA circuitry performing operations to implement one or more virtual machines and/or containers.

The example LWD cluster operator controller 110 is in connection with an example LWD 302. In the illustrated example, the LWD cluster operator controller 110 applies policies and upgrades to the example LWD 302. The example LWD 302 includes example cluster 1 (CLUSTER-1), example CLUSTER-2, example CLUSTER-3, example CLUSTER-4, example CLUSTER-5, and example CLUSTER-6. In the illustrated example of FIG. 3, when a policy, update, etc. is applied to the LWD 302, the policy, update, etc. is applied to all of the example clusters included in the LWD 302 (e.g., CLUSTER-1, CLUSTER-2, CLUSTER-3, CLUSTER-4, CLUSTER-5, CLUSTER-6).

The example LWD operator controller 104 includes an example upgrade interface 304, an example desired state configuration interface 306, an example certificate management interface 308, an example password management interface 310, an example cluster resolver controller 312, an example datastore 314, an example message bus 316, and an example cluster orchestrator controller 318. In some examples, the cluster resolver controller 312 is instantiated by programmable circuitry executing the cluster resolver controller instructions and/or configured to perform operations such as those represented by the flowchart of FIG. 5. In some examples, the cluster orchestrator controller 318 is instantiated by programmable circuitry executing cluster orchestrator controller instructions and/or configured to perform operations such as those represented by the flowchart of FIG. 5.

In the illustrated example of FIG. 3, the example LWD cluster operator controller 110 includes the example upgrade interface 304 to obtain instructions, from an SDDC manager and/or any type of management circuitry, to cause applying of an upgrade to the clusters in the LWD 302. Additionally and/or alternatively, the example upgrade interface 304 is to send instructions to the example cluster resolver controller 312. The instructions communicated by the example upgrade interface 304 include instructions to upgrade at least one or more of the clusters (CLUSTER-1, CLUSTER-2, CLUSTER-3, CLUSTER-4, CLUSTER-5, CLUSTER-6) from a current version to a new version. In some examples, the upgrade interface 304 receives instructions to upgrade only a selection of clusters in the LWD 302. In some examples, the upgrade interface 304 receives instructions to upgrade a cluster at a LWD level, a workload domain level, or a cluster level. In some examples, a user may wish to upgrade clusters from one version to a new version. In this example, the upgrade interface 304 is implemented by a create, read, upload, and delete (CRUD) plugin box. The CRUD plugin box is implemented using an API that enables a program to submit API calls to the CRUD plugin box to upgrade logical workload domain clusters.

In the illustrated example of FIG. 3, the LWD cluster operator controller 110 includes the example desired state configuration interface 306 to obtain instructions, from an SDDC manager and/or any type of management circuitry, indicative to apply a requested configuration across clusters to have a similar set of configurations on a cluster level. Additionally and/or alternatively, the example desired state configuration interface 306 is to send instructions to the example cluster resolver controller 312. The instructions communicated by the example desired state configuration interface 306 include instructions indicative of what configuration template to apply to the clusters (CLUSTER-1, CLUSTER-2, CLUSTER-3, CLUSTER-4, CLUSTER-5, CLUSTER-6) in the LWD 302. For example, the instructions may include a name of the configuration template that the cluster resolver controller 312 is to use for each cluster (CLUSTER-1, CLUSTER-2, CLUSTER-3, CLUSTER-4, CLUSTER-5, CLUSTER-6). In some examples, the instructions may include names, values, and other detailed parameters needed to "fill out" the configuration template. For example, the instructions may include a version of cluster (e.g., Kubernetes® version), a name of the appropriate network interface (e.g., container network interface (CNI) such as Multus, Calico, Antrea, etc.), a name of a storage interface (e.g., a container storage interface (CSI) such as vSphere® CSI), a class of the storage interface, one or more types of tools, etc. In some examples, the instructions indicate to use default parameters of the configuration template. In some examples, an administrator may apply a desired state configuration to the clusters in the LWD 302. In this example, the desired state configuration interface 306 is implemented by a create, read, upload, and delete (CRUD) plugin box. The CRUD plugin box is implemented using an API that enables a program to submit API calls to the CRUD plugin box to manage and configure clusters as a group.

In the illustrated example of FIG. 3, the LWD cluster operator controller 110 includes the example certification management interface 308 to obtain instructions, from an SDDC manager and/or any type of management circuitry, indicative to manage license and/or certifications of the LWD 302. Additionally and/or alternatively, the example certification management interface 308 is to send instructions to the example cluster resolver controller 312. The instructions communicated by the example certification management interface 308 include instructions indicative of who can access the at least one or more clusters (CLUSTER- 1, CLUSTER-2, CLUSTER-3, CLUSTER-4, CLUSTER-5, CLUSTER-6) and in what manner the at least one or more workload domains (CLUSTER-1, CLUSTER-2, CLUSTER-3, CLUSTER-4, CLUSTER-5, CLUSTER-6) can be accessed. In some examples, an administrator may add new users to a list of users who can access the clusters. In some examples, an administrator may update a user's status, such as a modification status, a read only status, etc. In this example, the certification management interface 308 is implemented by a create, read, upload, and delete (CRUD) plugin box. The CRUD plugin box is implemented using an API that enables a program to submit API calls to the CRUD plugin box to manage licenses and/or certifications of logical workload domain clusters.

In the illustrated example of FIG. 3, the LWD cluster operator controller 110 includes the example password management interface 310 to obtain instructions, from an SDDC manager and/or any type of management circuitry, indicative to update security settings of the clusters in LWD 302. Additionally and/or alternatively, the example password management interface 310 is to send instructions to the example cluster resolver controller 312. The instructions communicated by the example password management interface 310 include instructions to update security policies and/or security settings corresponding to the at least one or more clusters (CLUSTER-1, CLUSTER-2, CLUSTER-3, CLUSTER-4, CLUSTER-5, CLUSTER-6). A security policy may include a set of rules and/or guidelines that the LWD 302 is to follow in order to maintain protection of the workload domains and associated clusters in the LWD 302 from cyber attacks, etc. Security settings may include passwords, user identifiers, etc. In some examples, by applying a uniform password policy across clusters, rather than individually, the hosts are able to use the same passwords for connectivity. In this example, the password management interface 310 is implemented by a create, read, upload, and delete (CRUD) plugin box. The CRUD plugin box is implemented using an API that enables a program to submit API calls to the CRUD plugin box to manage security protocols of logical workload domain clusters.

In the illustrated example of FIG. 3, the LWD cluster operator controller 110 includes the example cluster resolver controller 312 to identify clusters (CLUSTER-1, CLUSTER-2, CLUSTER-3, CLUSTER-4, CLUSTER-5, CLUSTER-6) or LWDs (e.g., LWD 302) to which the instructions and/or requests, from any of the interfaces (e.g., the upgrade interface 304, the desired state configuration interface 306, the certification management interface 308, and/or the password management interface 310), correspond. For example, the cluster resolver controller 312 obtains the instructions from any one of the interfaces and analyzes the instructions to determine which clusters in the LWD 302 that the instructions correspond to. In some examples, analyzing the instructions includes identifying workload domain identifiers and/or cluster identifiers in the instructions. In some examples, a workload domain identifier and/or a cluster identifier may be a numerical value, an alpha-numeric value, a name, etc., that was given by a user to the workload domain and/or cluster when configuring the workload domain and/or cluster. In some examples, analyzing the instructions includes accessing identifying information in the request, the identifying information to identify the LWD, the workload domains, and/or the clusters as a target to perform the service.

In the illustrated example, the cluster resolver controller 312 submits a query to the datastore 314 based on the identifying information. For example, the cluster resolver controller 312 is to submit a query to the datastore 314 for a number of clusters in the LWD 302, based on utilizing the identifying information (e.g., the cluster identifiers), for names of the clusters in the LWD 302, for current versions of the clusters in the LWD 302, for current security policies of the clusters in the LWD 302, etc. Based on the query, the cluster resolver controller 312 is to identify the logical workload domain clusters as a target logical workload domain cluster to perform the service of the request. In the illustrated example, the cluster resolver controller 312 provides instructions to the cluster orchestrator controller 318, via the cluster operations message bus 316, indicative of the service to perform and on which and/or for which clusters the service is to be performed.

In some examples, the LWD cluster operator controller 110 includes means for resolving a LWD cluster to which an instruction and/or request is to apply. For example, the means for resolving a LWD cluster to which an instruction and/or request is to apply may be implemented by cluster resolver controller circuitry such as the cluster resolver controller 312. In some examples, the cluster resolver controller 312 may be instantiated by programmable circuitry such as the example programmable circuitry 812 of FIG. 8. For instance, the cluster resolver controller 312 may be instantiated by the example microprocessor 900 of FIG. 9 executing machine executable instructions such as those implemented by at least blocks 502, 504 of FIG. 5. In some examples, the cluster resolver controller 312 may be instantiated by hardware logic circuitry, which may be implemented by an ASIC, XPU, or the FPGA circuitry 1000 of FIG. 10 configured and/or structured to perform operations corresponding to the machine readable instructions. Additionally or alternatively, the cluster resolver controller 312 may be instantiated by any other combination of hardware, software, and/or firmware. For example, the cluster resolver controller 312 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) configured and/or structured to execute some or all of the machine readable instructions and/or to perform some or all of the operations corresponding to the machine readable instructions without executing software or firmware, but other structures are likewise appropriate.

In the illustrated example of FIG. 3, the LWD cluster operator controller 110 includes the example datastore 314 to store cluster information. Cluster information includes cluster configuration information, a number of clusters in the LWD 302, updates of the clusters in the LWD 302, state changes of the clusters in the LWD 302, etc. In some examples, the datastore 314 is to obtain updated LWD information in response to a new operation being applied to the clusters. For example, the datastore 314 is to obtain a report of a result of the operation performed on and/or at the clusters in the LWD 302. The example datastore 314 of this example may be implemented by a volatile memory (e.g., a Synchronous Dynamic Random Access Memory (SDRAM), Dynamic Random Access Memory (DRAM), RAMBUS Dynamic Random Access Memory (RDRAM), etc.) and/or a non-volatile memory (e.g., flash memory). The example datastore 314 may additionally or alternatively be implemented by one or more double data rate (DDR) memories, such as DDR, DDR2, DDR3, DDR4, mobile DDR (mDDR), etc. The example datastore 314 may additionally or alternatively be implemented by one or more mass storage devices such as hard disk drive(s), compact disk (CD)

drive(s), digital versatile disk (DVD) drive(s), solid-state disk drive(s), etc. While in the illustrated example the datastore 314 is illustrated as a single datastore, the example datastore 314 may be implemented by any number and/or type(s) of datastores. Furthermore, the data stored in the example datastore 314 may be in any data format such as, for example, binary data, comma delimited data, tab delimited data, structured query language (SQL) structures, etc.

In the illustrated example of FIG. 3, the LWD operator controller 104 includes the bus 316 to communicate operations and instructions from the cluster resolver controller 312 to the example cluster orchestrator controller 318. In the illustrated example, the bus 316 is implemented by a message broker. In the illustrated example, the bus 316 publishes the operations and/or instructions obtained by the cluster resolver controller 312. Once published, the example cluster orchestrator controller 318 can obtain the instructions and/or desired operations and apply them to the clusters (CLUSTER-1, CLUSTER-2, CLUSTER-3, CLUSTER-4, CLUSTER-5, CLUSTER-6) in the LWD 302. In some examples, the bus 316 provides the instructions and/or desired operations to the cluster orchestrator controller 318. In some examples, the cluster orchestrator controller 318 monitors the bus 316 and requests the instructions and/or operations.

In some examples, the LWD cluster operator controller 110 includes means for communicating and/or publishing instructions and/or operations. For example, the means for communicating and/or publishing instructions and/or operations may be implemented by the cluster operations bus 316. In some examples, the cluster operations bus 316 may be instantiated by programmable circuitry such as the example programmable circuitry 812 of FIG. 8. For instance, the cluster operations bus 316 may be instantiated by the example microprocessor 900 of FIG. 9 executing machine executable instructions such as those implemented by at least block 506 of FIG. 5. In some examples, cluster operations bus 316 may be instantiated by hardware logic circuitry, which may be implemented by an ASIC, XPU, or the FPGA circuitry 1000 of FIG. 10 configured and/or structured to perform operations corresponding to the machine readable instructions. Additionally or alternatively, the cluster operations bus 316 may be instantiated by any other combination of hardware, software, and/or firmware. For example, the cluster operations bus 316 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) configured and/or structured to execute some or all of the machine readable instructions and/or to perform some or all of the operations corresponding to the machine readable instructions without executing software or firmware, but other structures are likewise appropriate.

In the illustrated example of FIG. 3, the LWD cluster operator controller 110 includes the cluster orchestrator controller 318 to orchestrate operations corresponding to the clusters in the LWD 302 based on instructions obtained from the bus 316. The example cluster orchestrator controller 318 is to apply an operation to any one of the clusters to which the cluster resolver controller 312 indicated were to be applied. In some examples, the cluster orchestrator controller 318 takes an input from the bus 316 and triggers the workflows needed for applying the operation to the clusters. For example, the cluster resolver controller 312 takes an input from the bus 316 and determines that an upgrade to version 2.0 is to be applied to CLUSTER-1, CLUSTER-2, and CLUSTER-3. In an example, the upgrade to those clusters (CLUSTER-1, CLUSTER-2, and CLUSTER-3) is requested because CLUSTER-4, CLUSTER-5, and CLUSTER-6 are currently operating at version 2.0 and the user desires each cluster to be operating at the same version. The example cluster orchestrator controller 318 orchestrates the upgrade to version 2.0. In another example, the cluster resolver controller 312 takes an input from the bus 316 and determines a desired state for uniform HA/DRS policies is to be applied to the clusters (CLUSTER-1, CLUSTER-2, CLUSTER-3, CLUSTER-4, CLUSTER-5, and CLUSTER-6). Additionally, in some examples, the cluster resolver controller 312 takes an input from the bus and determines that a desired state configuration for adding a tag, toggling a secure shell protocol (SSH) of a host, assigning a default keyboard layout, creating a uniform network switch configuration, configuring uniform port groups, configuring authentication changes, configuring a shell timeout, and/or configuring a customer experience improvement program (CEIP) are to be applied to the clusters (CLUSTER-1, CLUSTER-2, CLUSTER-3, CLUSTER-4, CLUSTER-5, and CLUSTER-6).

In some examples, the cluster orchestrator controller 318 performs the operations (as described above) in fewer clock cycles than operations for clusters not included in a LWD. In some examples, the operation at each of the clusters (CLUSTER-1, CLUSTER-2, CLUSTER-3, CLUSTER-4, CLUSTER-5, CLUSTER-6) occurs simultaneously and/or concurrently and, thus, are complete before operations applied individually to clusters not in a LWD. In some examples, the cluster orchestrator controller 318 generates reports indicative of results of the operations applied to the clusters in the LWD 302. For example, the cluster orchestrator controller 318 may generate reports indicative that an upgrade was successful or unsuccessful, that a desired state configuration was successfully or unsuccessfully applied, etc. In some examples, the cluster orchestrator controller 318 generates reports indicative of resource usage after the operation was applied (e.g., CPU usage, memory capacity, etc.). The example cluster orchestrator controller 318 may be implemented by processor circuitry and/or controller circuitry.

In some examples, the LWD cluster operator controller 110 includes means for orchestrating operations and/or services. For example, the means for orchestrating operations and/or services may be implemented by cluster orchestrator controller circuitry such as the cluster orchestrator controller 318. In some examples, the cluster orchestrator controller 318 may be instantiated by programmable circuitry such as the example programmable circuitry 812 of FIG. 8. For instance, the cluster orchestrator controller 318 may be instantiated by the example microprocessor 900 of FIG. 9 executing machine executable instructions such as those implemented by at least blocks 508, 510, and 512 of FIG. 5. In some examples, the cluster orchestrator controller 318 may be instantiated by hardware logic circuitry, which may be implemented by an ASIC, XPU, or the FPGA circuitry 1000 of FIG. 10 configured and/or structured to perform operations corresponding to the machine readable instructions. Additionally or alternatively, the cluster orchestrator controller 318 may be instantiated by any other combination of hardware, software, and/or firmware. For example, the cluster orchestrator controller 318 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) configured and/or structured to execute some or all of the machine readable instructions and/or to perform some or all of the operations corresponding to the machine readable instructions without executing software or firmware, but other structures are likewise appropriate.

While an example manner of implementing the LWD cluster operator controller 110 of FIG. 1 is illustrated in FIG. 3, one or more of the elements, processes, and/or devices illustrated in FIG. 3 may be combined, divided, re-arranged, omitted, eliminated, and/or implemented in any other way. Further, the example upgrade interface 304, the example desired state configuration interface 306, the example certification management interface 308, the example password management interface 310, the example cluster resolver controller 312, the example cluster operations bus 316, the example cluster orchestrator controller 318, and/or, more generally, the example LWD cluster operator controller 110 of FIG. 3, may be implemented by hardware alone or by hardware in combination with software and/or firmware. Thus, for example, any of the upgrade interface 304, the example desired state configuration interface 306, the example certification management interface 308, the example password management interface 310, the example cluster resolver controller 312, the example cluster operations bus 316, the example cluster orchestrator controller 318, and/or, more generally, the example LWD cluster operator controller 110, could be implemented by programmable circuitry in combination with machine readable instructions (e.g., firmware or software), processor circuitry, analog circuit(s), digital circuit(s), logic circuit(s), programmable processor(s), programmable microcontroller(s), graphics processing unit(s) (GPU(s)), digital signal processor(s) (DSP(s)), ASIC(s), programmable logic device(s) (PLD(s)), and/or field programmable logic device(s) (FPLD(s)) such as FPGAs. Further still, the example LWD cluster operator controller 110 of FIG. 3 may include one or more elements, processes, and/or devices in addition to, or instead of, those illustrated in FIG. 3, and/or may include more than one of any or all of the illustrated elements, processes and devices.

Figure 4:
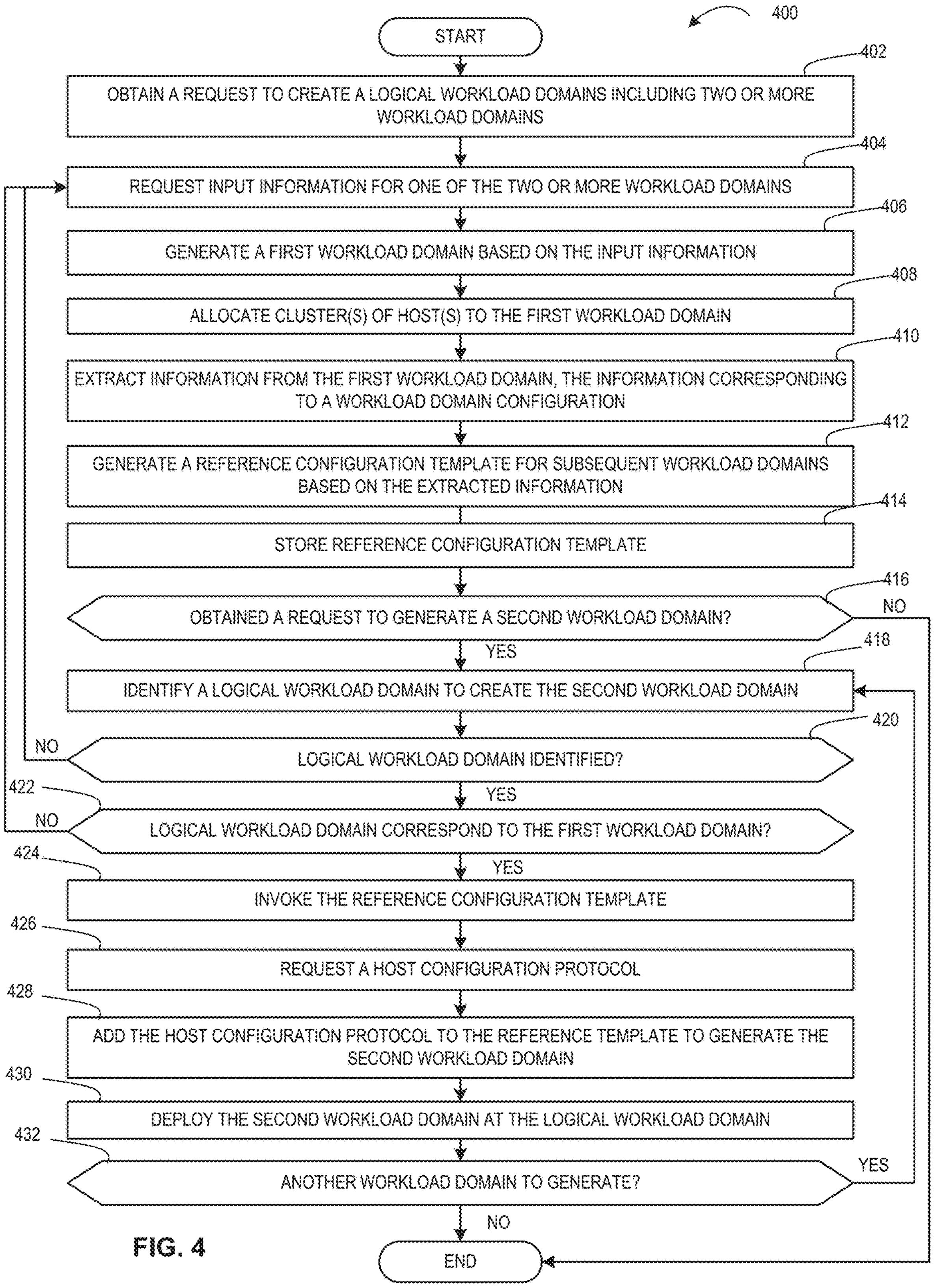
FIG. 4 is a flowchart representative of example machine readable instructions and/or example operations that may be executed, instantiated, and/or performed by example programmable circuitry to implement the LWD management controller of FIG. 1.
Figure 5:
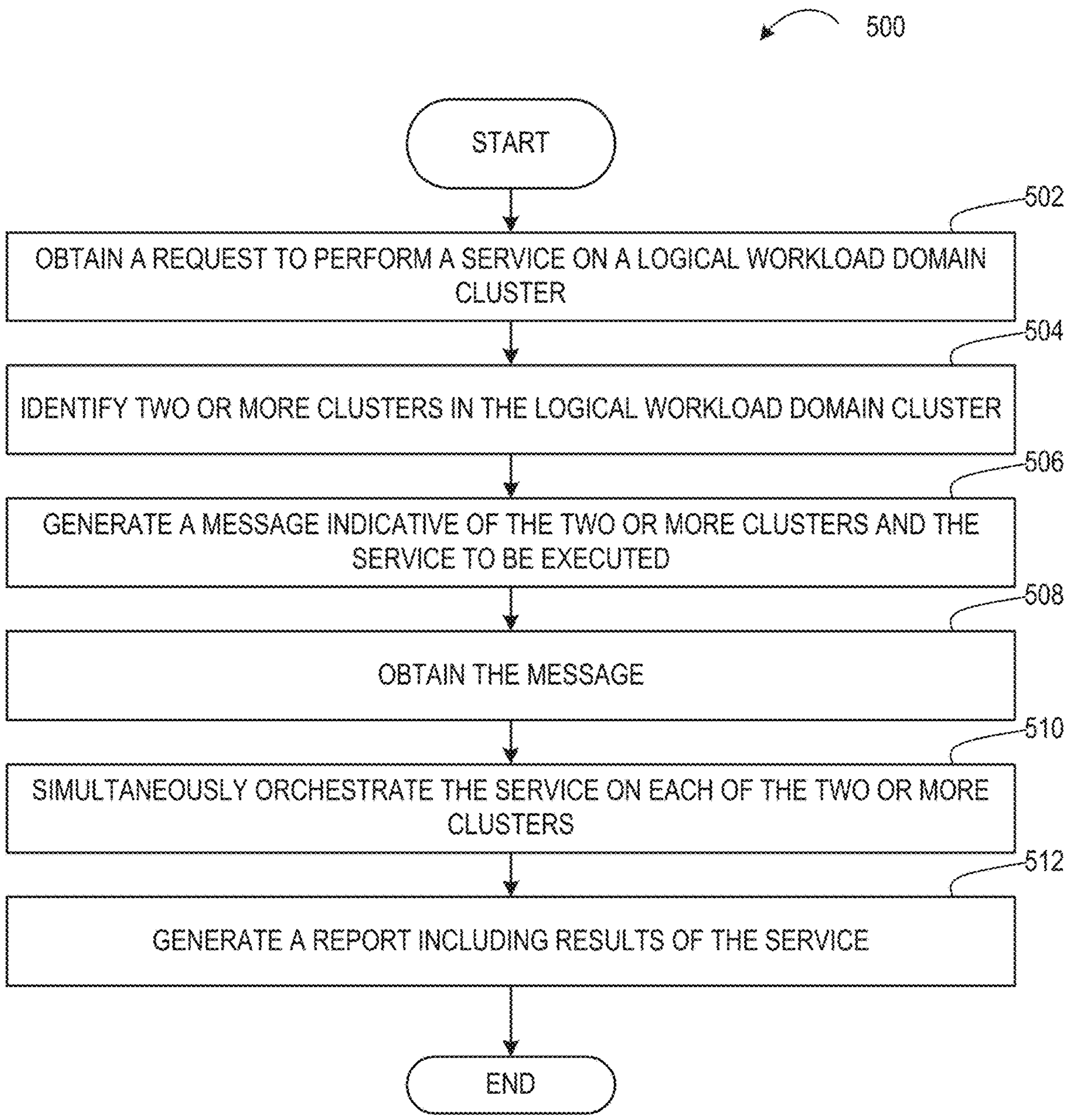
FIG. 5 is a flowchart representative of example machine readable instructions and/or example operations that may be executed, instantiated, and/or performed by example programmable circuitry to implement the LWD cluster operator controller of FIGS. 1 and 3.
Figure 6:
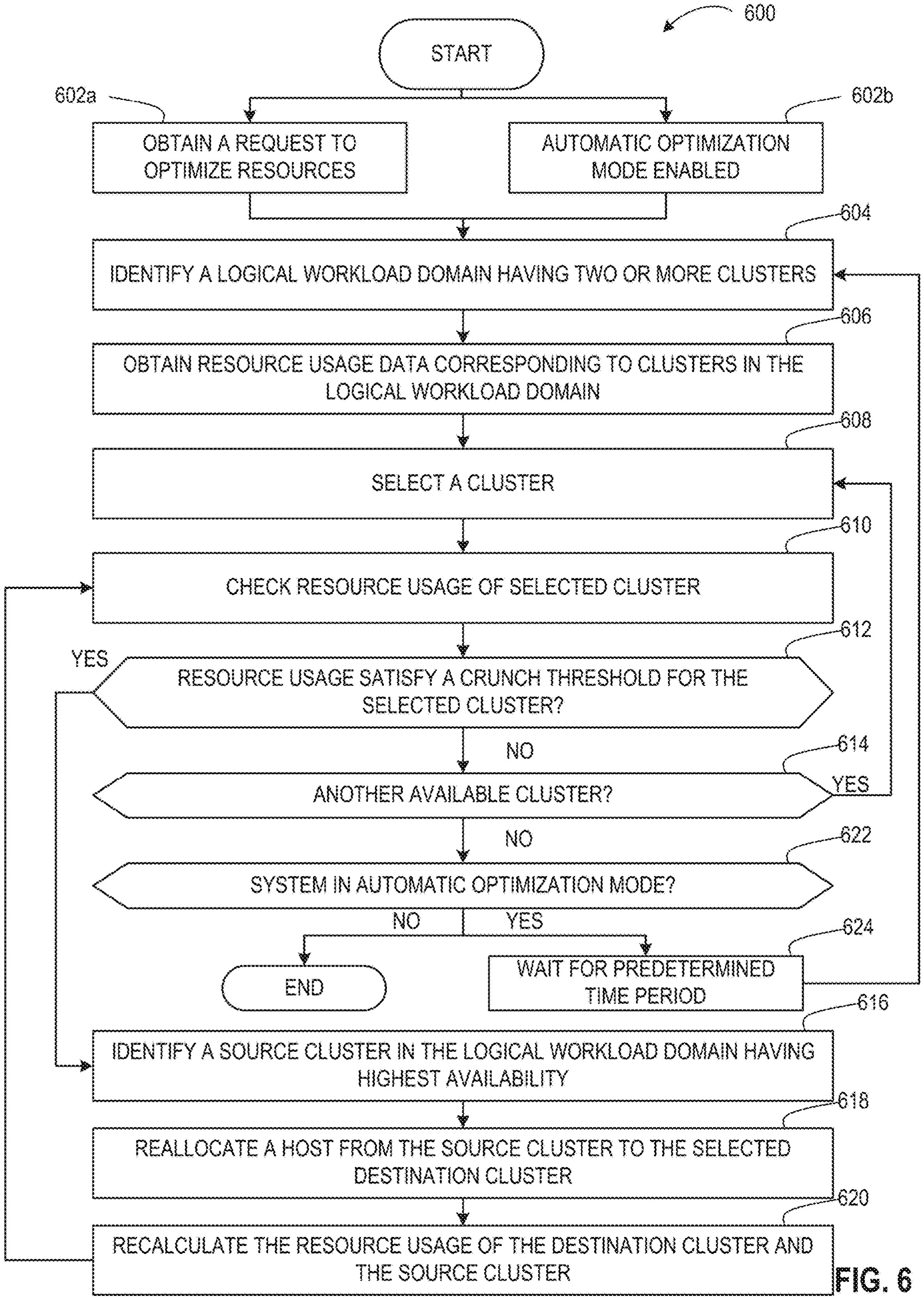
FIG. 6 is a flowchart representative of example machine readable instructions and/or example operations that may be executed, instantiated, and/or performed by example programmable circuitry to implement the LWD cluster management controller of FIGS. 1 and 2.

Flowchart(s) representative of example machine readable instructions, which may be executed by programmable circuitry to implement and/or instantiate the LWD system 100 of FIG. 1 and/or representative of example operations which may be performed by programmable circuitry to implement and/or instantiate the LWD system 100 of FIG. 1, are shown in FIGS. 4-6. The machine readable instructions may be one or more executable programs or portion(s) of one or more executable programs for execution by programmable circuitry such as the programmable circuitry 812 shown in the example processor platform 800 discussed below in connection with FIG. 8 and/or may be one or more function(s) or portion(s) of functions to be performed by the example programmable circuitry (e.g., an FPGA) discussed below in connection with FIGS. 9 and/or 10. In some examples, the machine readable instructions cause an operation, a task, etc., to be carried out and/or performed in an automated manner in the real world. As used herein, "automated" means without human involvement.

The program(s) may be embodied in instructions (e.g., software and/or firmware) stored on one or more non-transitory computer readable and/or machine readable storage medium such as cache memory, a magnetic-storage device or disk (e.g., a floppy disk, a Hard Disk Drive (HDD), etc.), an optical-storage device or disk (e.g., a Blu-ray disk, a Compact Disk (CD), a Digital Versatile Disk (DVD), etc.), a Redundant Array of Independent Disks (RAID), a register, ROM, a solid-state drive (SSD), SSD memory, non-volatile memory (e.g., electrically erasable programmable read-only memory (EEPROM), flash memory, etc.), volatile memory (e.g., Random Access Memory (RAM) of any type, etc.), and/or any other storage device or storage disk. The instructions of the non-transitory computer readable and/or machine readable medium may program and/or be executed by programmable circuitry located in one or more hardware devices, but the entirety of the program(s) and/or parts thereof could alternatively be executed and/or instantiated by one or more hardware devices other than the programmable circuitry and/or embodied in dedicated hardware. The machine readable instructions may be distributed across multiple hardware devices and/or executed by two or more hardware devices (e.g., a server and a client hardware device). For example, the client hardware device may be implemented by an endpoint client hardware device (e.g., a hardware device associated with a human and/or machine user) or an intermediate client hardware device gateway (e.g., a radio access network (RAN)) that may facilitate communication between a server and an endpoint client hardware device. Similarly, the non-transitory computer readable storage medium may include one or more mediums. Further, although the example programs are described with reference to the flowchart illustrated in FIGS. 4-6, many other methods of implementing the example LWD system 100 of FIG. 1 may alternatively be used. For example, the order of execution of the blocks of the flowchart may be changed, and/or some of the blocks described may be changed, eliminated, or combined. Additionally or alternatively, any or all of the blocks of the flowcharts may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The programmable circuitry may be distributed in different network locations and/or local to one or more hardware devices (e.g., a single-core processor (e.g., a single core CPU), a multi-core processor (e.g., a multi-core CPU, an XPU, etc.)). For example, the programmable circuitry may be a CPU and/or an FPGA located in the same package (e.g., the same integrated circuit (IC) package or in two or more separate housings), one or more processors in a single machine, multiple processors distributed across multiple servers of a server rack, multiple processors distributed across one or more server racks, etc., and/or any combination(s) thereof.

The machine readable instructions described herein may be stored in one or more of a compressed format, an encrypted format, a fragmented format, a compiled format, an executable format, a packaged format, etc. Machine readable instructions as described herein may be stored as data (e.g., computer-readable data, machine-readable data, one or more bits (e.g., one or more computer-readable bits, one or more machine-readable bits, etc.), a bitstream (e.g., a computer-readable bitstream, a machine-readable bitstream, etc.), etc.) or a data structure (e.g., as portion(s) of instructions, code, representations of code, etc.) that may be utilized to create, manufacture, and/or produce machine executable instructions. For example, the machine readable instructions may be fragmented and stored on one or more storage devices, disks and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine readable instructions may be stored in multiple parts, which are individually compressed, encrypted, and/or stored on separate computing devices, wherein the parts when decrypted, decompressed, and/or combined form a set of computer-executable and/or machine executable instructions that implement one or more functions and/or operations that may together form a program such as that described herein.

In another example, the machine readable instructions may be stored in a state in which they may be read by programmable circuitry, but require addition of a library (e.g., a dynamic link library (DLL)), a software development kit (SDK), an application programming interface (API), etc., in order to execute the machine-readable instructions on a particular computing device or other device. In another example, the machine readable instructions may need to be configured (e.g., settings stored, data input, network addresses recorded, etc.) before the machine readable instructions and/or the corresponding programs can be executed in whole or in part. Thus, machine readable, computer readable and/or machine readable media, as used herein, may include instructions and/or program(s) regardless of the particular format or state of the machine readable instructions and/or program(s).

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example operations of FIGS. 4-6 may be implemented using executable instructions (e.g., computer readable and/or machine readable instructions) stored on one or more non-transitory computer readable and/or machine readable media. As used herein, the terms non-transitory computer readable medium, non-transitory computer readable storage medium, non-transitory machine readable medium, and/or non-transitory machine readable storage medium are expressly defined to include any type of computer readable storage device and/or storage disk and to exclude propagating signals and to exclude transmission media. Examples of such non-transitory computer readable medium, non-transitory computer readable storage medium, non-transitory machine readable medium, and/or non-transitory machine readable storage medium include optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information). As used herein, the terms "non-transitory computer readable storage device" and "non-transitory machine readable storage device" are defined to include any physical (mechanical, magnetic and/or electrical) hardware to retain information for a time period, but to exclude propagating signals and to exclude transmission media. Examples of non-transitory computer readable storage devices and/or non-transitory machine readable storage devices include random access memory of any type, read only memory of any type, solid state memory, flash memory, optical discs, magnetic disks, disk drives, and/or redundant array of independent disks (RAID) systems. As used herein, the term "device" refers to physical structure such as mechanical and/or electrical equipment, hardware, and/or circuitry that may or may not be configured by computer readable instructions, machine readable instructions, etc., and/or manufactured to execute computer-readable instructions, machine-readable instructions, etc.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities, etc., the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities, etc., the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements, or actions may be implemented by, e.g., the same entity or object. Additionally, although individual features may be included in different examples or claims, these may possibly be combined, and the inclusion in different examples or claims does not imply that a combination of features is not feasible and/or advantageous.

FIG. 4 is a flowchart representative of example machine readable instructions and/or example operations 400 that may be executed, instantiated, and/or performed by programmable circuitry to configure and deploy workload domains and logical workload domains. The machine readable instructions and/or operations 400 of FIG. 4 begin at block 402 at which the LWD system 100 (FIG. 1) obtains a request to create a logical workload domain including two or more workload domains. For example, the LWD management controller 102 (FIG. 1) obtains instructions to create a LWD (e.g., LWD 116*a*, LWD 116*b*). In this example, the request specifies creation of a new LWD. For example the workload domains have not yet been configured and deployed and, thus, the LWD does not exist. Additionally and/or alternatively, the request includes instructions to assign a previously configured workload domain to a previously configured LWD.

The example LWD system 100 requests input information for one of the two or more workload domains (block 404). For example, the LWD management controller 102 requires additional information to configure a workload domain. In some examples, a request to create a LWD domain includes some information about the desired workload domain, such as a job of the workload domain (e.g., the intended use of the workload domain), the creator of the workload domain, a cluster name, management and host components, etc. The input information is to assist the LWD management controller 102 in configuring the workload domain prior to deployment. In some examples, the input information is to be utilized to create a template for workload domains in the LWD.

The example LWD system 100 generates a first workload domain based on the input information (block 406). For example, the LWD management controller 102 configures and deploys the first workload domain with information specific to the input information. In some examples, the input information includes a domain name, an organization name, a cluster name, a cluster image, a username, a password, and/or a host configuration protocol (e.g., a dynamic host configuration protocol (DHCP) that provides and assigned an IP address to a host). In some examples, the input information includes an indication to add the first workload domain to the requested LWD. Therefore, the first workload domain is configured to be included in the requested LWD and deployed as a workload domain grouped within the requested LWD.

The example LWD system 100 allocates cluster(s) of host(s) to the first workload domain (block 408). For example, the LWD management controller 102 allocates one or more clusters (VI-1-CLUSTER-1, VI-1-CLUSTER-2) that the first workload domain is to execute on and/or consume resources from, the one or more clusters including one or more host(s). In some examples, the LWD management controller 102 is to select one or more available hosts to be included in the cluster(s) (VI-1-CLUSTER-1, VI-1-CLUSTER-2) for the first workload domain based on the host configuration protocol. Additionally and/or alternatively, the example LWD management controller 102 is to select one or more available hosts based on the available resources of the host, a priority of the job of the first workload domain (e.g., a high priority job that should have a lot of resources, a low priority job that has the bandwidth to share resources, etc.), etc.

The example LWD system 100 extracts information from the first workload domain, the information corresponding to a workload domain configuration (block 410). For example, the LWD management controller 102 copies information from the configuration of the first workload domain. In some examples, the copied information includes a domain name, an organization name, a cluster name, a cluster image, a username, a password, and/or a LWD identifier (e.g., an identifier of the requested LWD), etc.

The example LWD system 100 generates a reference configuration template for subsequent workload domains based on the extracted information (block 412). For example, the LWD management controller 102 generates a file of pre-configured information that is typically repeated in other workload domains. In some examples, the pre-configured information is associated with the LWD. For example, one reference configuration template is utilized for a first LWD and a different reference configuration template with different pre-configured information is utilized for a second LWD.

The example LWD system 100 stores the reference configuration template (block 414). For example, the LWD management controller 102 store the reference configuration template at the datastore 106 (FIG. 1).

The example LWD system 100 determines whether a request is obtained to generate a second workload domain (block 416). For example, the LWD management controller 102 waits to obtain a request to deploy a second workload domain. In some examples, a request to create the second workload domain is in a queue in response to receiving the request to create the logical workload domain. For example, a user may send a request for a generation of two workload domains. In such examples, the LWD management controller 102 retrieves the request from an interface and/or any type of memory (e.g., cache).

In some examples, when the LWD system 100 determines a second request has been obtained (e.g., block 416 returns a value YES), the LWD system 100 identifies a logical workload domain to create the second workload domain (block 418). For example, the LWD management controller 102 determines if the request to generate the second workload domain is a request to include the second workload domain in the LWD. In some examples, the request may not indicate that a workload domain is to be included in a LWD and, thus, a logical workload domain is not identified. In some examples, when the LWD system 100 determines a second request has not been obtained (e.g., block 416 returns a value NO), the operations 400 end.

The example LWD system 100 determines whether a LWD has been identified (block 420). For example, the LWD management controller 102 determines whether a description of the second workload domain matches a description of the LWD. Additionally and/or alternatively, the example LWD management controller 102 determines whether specific data (e.g., metadata) is included in the request corresponding to the LWD. In some examples, if the LWD system 100 does not identify a LWD (e.g., block 420 returns a value NO), control returns to block 404.

In some examples, if the LWD system 100 does identify a LWD (e.g., block 420 returns a value YES), the example LWD system 100 determines whether an identified LWD corresponds to the first workload domain (block 422). For example, the LWD management controller 102 scans the request to identify data and/or information indicative of a LWD. In some examples, if the LWD system 100 determines that the identified LWD does not correspond to the first workload domain (e.g., block 422 returns a value NO), control returns to block 404.

In some examples, if the LWD system 100 determines that the identified LWD does correspond to the first workload domain (e.g., block 422 returns a value YES), the example LWD system 100 invokes the reference configuration template (block 424). For example, the LWD management controller 102 obtains the reference configuration template that includes pre-configured information for workload domains in the LWD.

The example LWD system 100 requests a host configuration protocol (block 426). For example, the LWD management controller 102 requests input information corresponding to which cluster(s) of host(s) and/or to which IP address the second workload domain system is to be associated.

The example LWD system 100 adds the host configuration protocol to the reference template to generate the second workload domain (block 428). For example, the LWD management controller 102 populates the reference configuration template with the specific host configuration protocol. In some examples, by populating the reference configuration template with the host configuration protocol, the reference configuration template becomes a unique workload domain that is ready for deployment. For example, the reference configuration template becomes the second workload domain.

The example LWD system 100 deploys the second workload domain at the LWD (block 430). For example, the LWD management controller 102 deploys the second workload domain and associates it with the example LWD. In the illustrated example, the first workload domain and the second workload domain can be consumed as a single resource.

The example LWD system 100 determines whether another workload domain is to be generated (block 432). For example, the LWD management controller 102 may obtain more requests to configure and deploy workload domains and/or may reference a queue of requests to configure and/or deploy workload domains. If the example LWD system 100 determines another workload domain is to be generated (e.g., block 432 returns a value YES), control returns to block 418.

If the example LWD system 100 determines another workload domain is not to be generated (e.g., block 432 returns a value NO), the example operations 400 end.

FIG. 5 is a flowchart representative of example machine readable instructions and/or example operations 500 that may be executed and/or instantiated by processor circuitry to perform a service on one or more LWD clusters. The machine readable instructions and/or operations 500 of FIG. 5 begin at block 502 at which the LWD system 100 of FIG. 1 obtains a request to perform a service on a logical workload domain cluster. For example, any of the upgrade interface 304, the desired state configuration interface 306, the certification management interface 308, and/or the password management interface 310 of FIG. 3 may obtain a request, as an API call, to perform an operation, such as apply desired state configurations to the clusters, update security policies of the clusters, upgrade versions of the clusters, apply a uniform password to the clusters, etc.

The example LWD system 100 identifies two or more clusters in the LWD cluster (block 504). For example, the LWD cluster operator controller 110 (FIGS. 1 and 3) and/or the example cluster resolver controller 312 (FIG. 3) analyzes instructions in the request to identify cluster identifiers. Additionally and/or alternatively, the example cluster resolver controller 312 queries the datastore 314 (FIG. 3) for which clusters are in and/or correspond to the LWD. In some examples, the cluster resolver controller 312 is to identify additional information about the clusters based on the instructions in the request. For example, if a request specifies performing an upgrade for clusters running at version 1.2 to version 1.4, the example cluster resolver controller 312 is to identify which clusters, in the LWD, run at version 1.2.

The example LWD system 100 is to generate a message indicative of the two or more clusters and the service to be executed (block 506). For example, the cluster operations message bus 316 is to configure and publish a message, such as instructions, a request, etc., based on communication from the cluster resolver controller 312. For example, the cluster resolver controller 312 is to notify the bus 316 (FIG. 3) of the desired and/or intended operation, obtained at block 502, and the appropriate clusters to which the service is to be applied. In this example, the bus 316 publishes a message and/or instructions indicating the intended operation and the selected cluster(s).

The example LWD system 100 is to obtain the message (block 508). For example, the LWD cluster operator controller 110 and/or the cluster orchestrator controller 318 (FIG. 3) is to retrieve and/or obtain the instructions from the bus 316. In some examples, the cluster orchestrator controller 318 subscribes to the bus 316 and is notified when new messages are published.

The example LWD system 100 simultaneously and/or concurrently orchestrates the service on each of the two or more clusters (block 510). For example, the LWD cluster operator controller 110 and/or the cluster orchestrator controller 318 is to apply the service, identified in the message from the bus 316, to all of the clusters also identified in the message from the bus 316. For example, the LWD cluster operator controller 110 and/or the cluster orchestrator controller 318 applies the service by identifying the service for each cluster in the LWD and configuring the service for the clusters. The example cluster orchestrator controller 318 configures the service by generating instructions that include relevant data for the particular cluster. For example, when a desired state configuration is to be applied to the clusters, the cluster orchestrator controller 318 includes relevant information relating to how each cluster should be configured, including a version of the cluster, storage size and/or storage interface of the cluster, tools to be added to the clusters, etc. In some examples, when the passwords are to be updated, the cluster orchestrator controller 318 includes relevant information in the instructions about previous passwords used by which clusters and the new password to be applied to the clusters. The example cluster orchestrator controller 318 conveys the instructions to the clusters.

The example LWD system 100 generates a report including results of the service (block 512). For example, the cluster orchestrator controller 318 generates reports indicative of the outcome of the uniform configuration (e.g., a desired state configuration) as successful or unsuccessful. In some examples, the cluster orchestrator controller 318 generates reports indicative of resource usage after the operation was applied (e.g., CPU usage, memory capacity, etc.).

The example operations 500 end after the LWD system 100 generates a report. In some examples, the operations 500 may be repeated when the example LWD system 100 obtains a new request to perform a service.

FIG. 6 is a flowchart representative of example machine readable instructions and/or example operations 600 that may be executed, instantiated, and/or performed by programmable circuitry to optimize resources across clusters. The example machine-readable instructions and/or the example operations 600 of FIG. 6 begin at block 602*a*, at which the LWD system 100 (FIG. 1) obtains a request to optimize resources. For example, the LWD cluster management controller 108 (FIGS. 1 and 2) and/or the cluster management control interface 202 (FIG. 2) obtains an instruction from a user and/or administrator to optimize resources. Alternatively, the example machine-readable instructions and/or the example operations 600 of FIG. 6 begin at block 602*b*, at which the LWD system 100 determines that an automatic optimization mode has been enabled. For example, the LWD cluster management controller 108 and/or the cluster management control interface 202 obtains instructions to automatically optimize resource utilization in a cluster. The difference between the instructions to automatically optimize resource utilization and the request to optimize resources is that the automatic optimization mode will periodically monitor resource usage of the clusters (see block 622), while the non-automatic optimization will not periodically monitor the resource usage of the clusters.

The example LWD system 100 identifies a LWD having two or more clusters (block 604). For example, the LWD cluster management controller 108 and/or the resource monitor controller 206 (FIG. 2) selects a LWD to analyze. In some examples, the resource monitor controller 206 queries the host management control interface 204 to provide information on LWDs in order to select a LWD having two or more clusters.

The example LWD system 100 selects a cluster (block 608). For example, the LWD cluster management controller 108 and/or the resource monitor controller 206 identifies a cluster, in the LWD, to analyze. In some examples, the resource monitor controller 206 selects a first cluster in the LWD based on an identifier of the first cluster. For example, the resource monitor controller 206 iterates through the clusters in the LWD and, thus, iterates numerically and/or alphabetically based on the naming convention (e.g., identifier) of the clusters. For example, if the clusters have numerical identifiers (cluster-1, cluster-2, cluster-3, etc.), then the example resource monitor controller 206 iterates numerically through the clusters (e.g., selects cluster-1 to analyze first, selects cluster-2 to analyze second, etc.). In some examples, if the clusters have alphabetical identifiers (e.g., cluster-A, cluster-B, cluster-C, etc.), then the example resource monitor controller 206 iterates alphabetically through the clusters (e.g., selects cluster-A to analyze first, selects cluster-B to analyze second, etc.). Alternatively, the example resource monitor controller 206 can utilize any method to select a cluster to analyze in the LWD.

The example LWD system 100 checks resource usage of the selected cluster (block 610). For example, the LWD cluster management controller 108 and/or the resource monitor controller 206 obtains data from the hosts in the clusters that provide insight into resource utilization, performance metrics, and overall health of a virtual infrastructure. In some examples, the resource monitor controller 206 obtains or determines a percentage value related to the resource usage of the selected cluster.

The example LWD system 100 determines whether resource usage satisfies a crunch threshold for the selected cluster (block 612). For example, the LWD cluster management controller 108 and/or the resource monitor controller 206 compares the resource usage (e.g., denoted as a percentage) to a pre-defined threshold value that represents an upper limit of the resource usage in the selected cluster. In some examples, when a resource usage satisfies the crunch threshold, the resource monitor controller 206 determines that the selected cluster is in a critical condition. In some examples, when the resource usage does not satisfy the crunch threshold, the resource monitor controller 206 determines that the selected cluster is not in a critical condition.

In some examples, when the LWD system 100 determines that the resource usage satisfies a crunch threshold for the selected cluster (e.g., block 612 returns a value YES), the LWD system 100 identifies a source cluster in the LWD having highest availability (block 616). For example, the LWD cluster management controller 108 and/or resource optimization controller 208 is provided with pre-defined availability threshold values indicative of a resource availability of a cluster. In some examples, the resource optimization controller 208 utilizes the availability threshold to identify a source cluster that has available hosts that can be used to reduce a crunch of the selected cluster in the critical situation.

The example LWD system 100 reallocates a host from the source cluster to the selected destination cluster (block 618). In some examples, when the resource monitor controller 206 determines that the selected cluster is in a critical situation, the selected cluster becomes a selected destination cluster. Therefore, the example LWD cluster management controller 108 and/or the example resource optimization controller 208 instructs the example host movement controller 210 to reallocate a host from the source cluster to the selected destination cluster. The example host movement controller 210 reconfigures the host from the source cluster with information of the selected destination cluster in order to reallocate the host in the source cluster.

The example LWD system 100 recalculates the resource usage of the destination cluster and the source cluster (block 620). For example, the LWD cluster management controller 108 and/or the resource optimization controller 208 collects resource usage data from the source cluster and selected destination cluster after the clusters have been reconfigured.

In some examples, after the host has been reallocated, control returns to block 610 where the LWD cluster management controller 108 and/or the resource monitor controller 206 compares the resource usage data to the crunch threshold to determine if 1) there is still a critical situation at the destination cluster or 2) there is a new critical situation at the source cluster due to the reallocation of one of its clusters.

In some examples, when the LWD system 100 determines that the resource usage does not satisfy a crunch threshold for the selected cluster (e.g., block 612 returns a value NO), the LWD system 100 determines whether there is another available cluster (block 614). For example, the LWD cluster management controller 108 and/or the resource monitor controller 206 identifies the next cluster in the LWD to analyze. In some examples, the resource monitor controller 206 selects the next cluster in the LWD based on an iteration through the cluster's identifiers.

In some examples, if the resource monitor controller 206 determines that there is another available cluster (e.g., block 614 returns a value YES), control returns to block 608. For example, the resource monitor controller 206 selects the next cluster to analyze.

In some examples, if the resource monitor controller 206 determines that there is not another available cluster (e.g., block 614 returns a value NO), the LWD cluster management controller 108 determines whether the system is in an automatic optimization mode (block 622). For example, the LWD cluster management controller 108 identifies whether the scheduling controller 212 is active or inactive. In some examples, if the LWD cluster management controller 108 determines that the system is in automatic optimization mode (e.g., block 622 returns a value YES), then the example LWD cluster management controller 108 and/or the example scheduling controller 212 waits for a predetermined time period (block 624). For example, the scheduling controller 212 is provided with a time period to periodically check the resource usage of the clusters. In some examples, the scheduling controller 212 is implemented by a counter, set with the predetermined time period and triggered when all clusters in the LWD have been analyzed. In some examples, the scheduling controller 212 triggers the resource monitor controller 206 when the time period ends. For example, control returns to block 604 when the time period ends.

In some examples, when the LWD cluster management controller 108 determines that the system is not in an automatic optimization mode (e.g., block 622 returns a value NO), the example operations 600 end. For example, the scheduling controller 212 is inactive when an automatic optimization mode is not enabled and, thus, the LWD cluster management controller 108 does not repeat the operations 600 until another request to optimize resources has been obtained (e.g., block 602*a*).

Figure 7A:
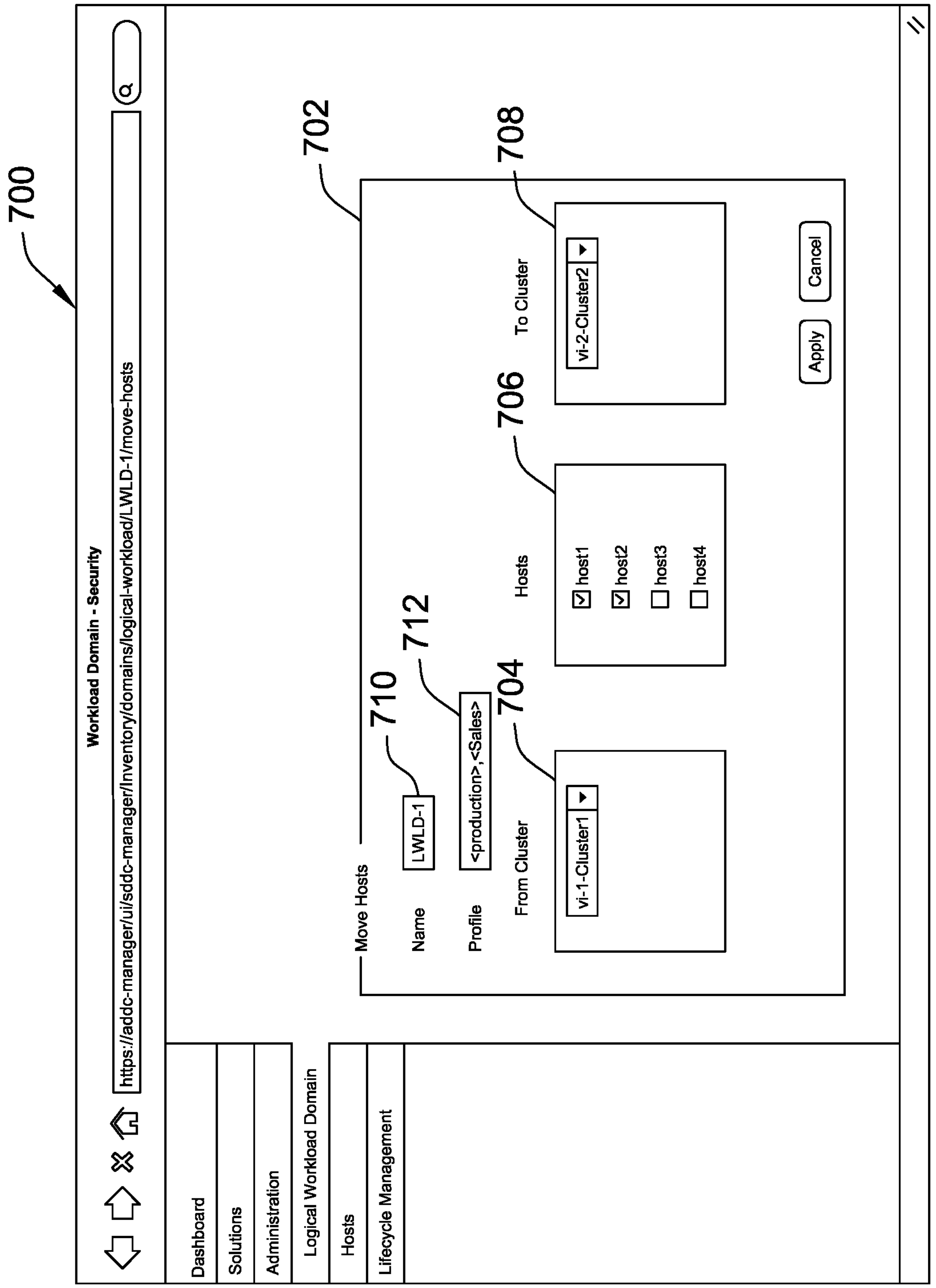
FIGS. 7A-7G are graphical user interfaces (GUIs) corresponding to an example LWD cluster management controller and an example LWD cluster operator controller of the example LWD system of FIG. 1.

FIGS. 7A, 7B, 7C, 7D, 7E, 7F, and 7G depict example user interface (UI) visualizations corresponding to an example SDDC manager, which manages the example LWD system 100. FIG. 7A depicts an example first UI visualization 700 corresponding to a manual host movement option. The first UI visualization 700 of the illustrated example of FIG. 7A includes an example visualization pane or window 702 that includes an example source cluster topology 704, an example host topology 706, an example destination cluster topology 708, an example workload domain name 710, and an example profile description input 712.

In the illustrated example of FIG. 7A, the first UI visualization 700 corresponds to manually moving a host from a source cluster to a destination cluster in a LWD. The example source cluster topology 704 enables a user to select a source cluster in LWD-1 (or any selected LWD) from which they wish to move one or more selected hosts. The example host topology 706 enables the user to select one or more hosts, from the selected source cluster, to move or to reallocate. The example destination cluster topology 708 enables the user to select the destination cluster, in LWD-1, to which they want to reallocate the selected host(s). The example profile description input 712 enables users to see a description of the LWD. For example, the profile description input 712 describes a purpose or application of the selected LWD.

Figure 7B:
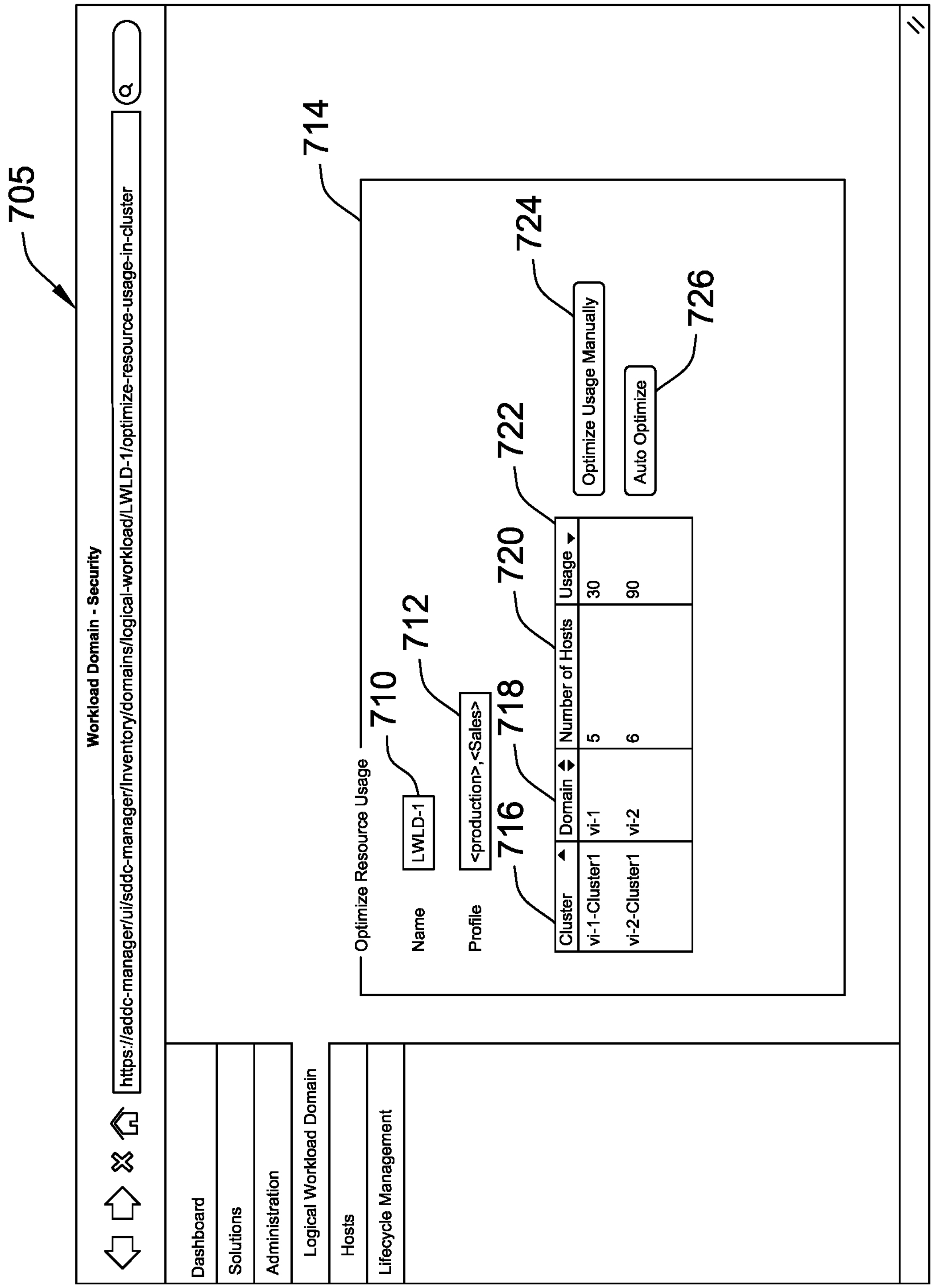

FIG. 7B depicts an example second UI visualization 705 corresponding to automatically optimizing resource usage across clusters in a LWD. The second UI visualization 705 of the illustrated example of FIG. 7B includes an example visualization pane or window 714 that includes the example workload domain name text field 710, the example profile description input text field 712, an example cluster list 716, an example workload domain list 718, an example number of hosts column 720, an example resource usage column 722, an example manual optimization option 724, and an example automatic optimization option 726.

In the illustrated example of FIG. 7B, the second UI visualization 705 corresponds to automatically optimizing resource usage across clusters in LWD-1. The example automatic optimization option 726 enables a user to enable automatic optimization mode of the example LWD cluster management controller 108 (FIGS. 1 and 2). The example cluster list 716, the example workload domain list 718, the exam hosts column 720, and the example resource usage column 722 provides a user with information related to the clusters in LWD-1 (or any selected LWD). In the example second UI visualization 705, cluster vi-2-Cluster1 in workload domain 2 (vi-2) has a 90% usage status, indicating that 90% of the resources (e.g., CPU, memory, etc.) allocated to cluster vi-2-Cluster1 are in use. Additionally, the example second UI visualization 705 indicates that cluster vi-1-Cluster1 in workload domain 1 (vi-1) is only using 30% of its allocated resources.

Figure 7C:
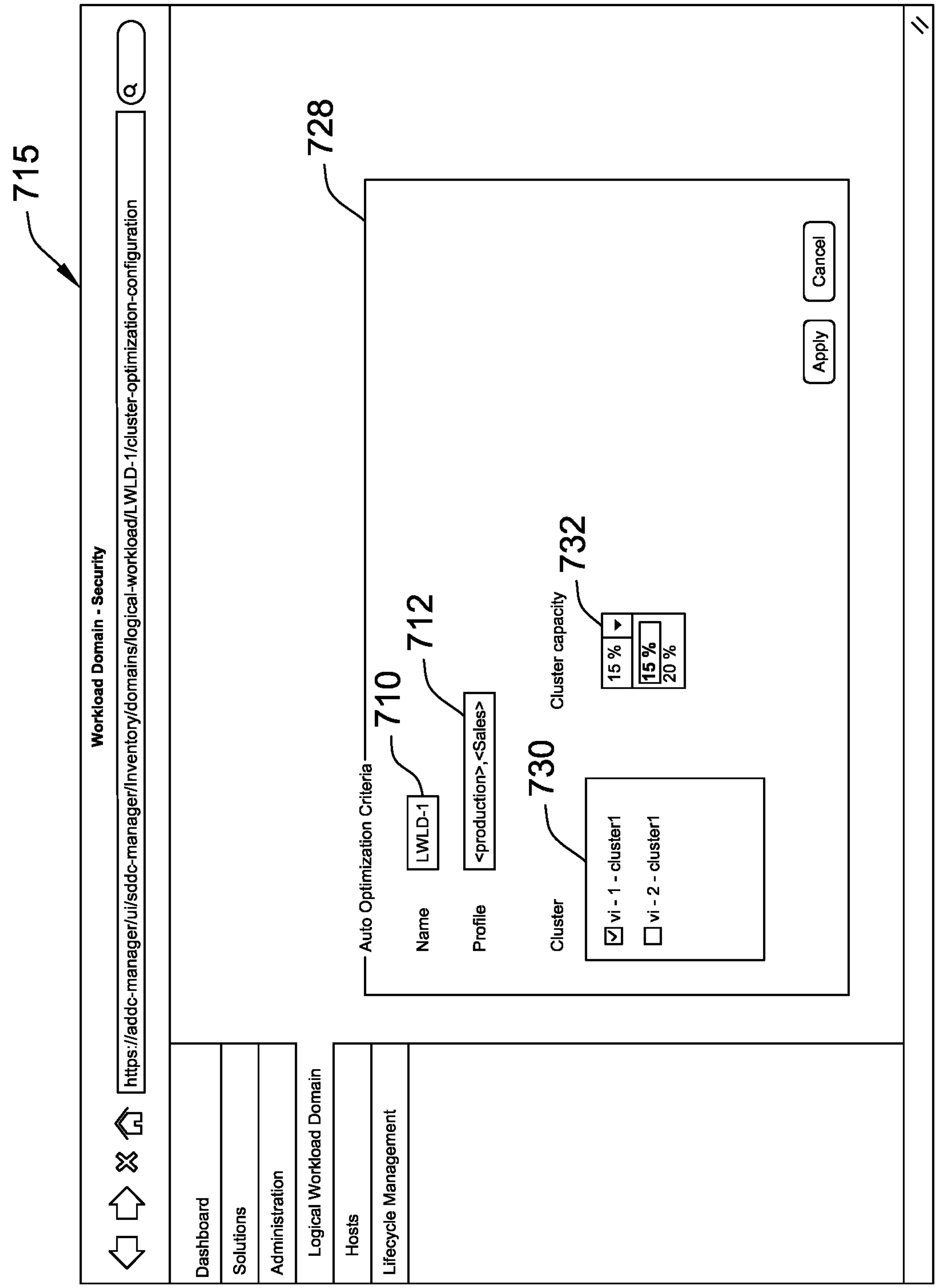

FIG. 7C depicts an example third UI visualization 715 corresponding to selecting criteria for the automatic optimization mode. The third UI visualization 715 of the illustrated example of FIG. 7C includes the example visualization pane or window 728 that includes the example workload domain name text field 710, the example profile description input text field 712, an example cluster topology selection control 730, and an example capacity percentage dropdown list control 732.

In the illustrated example of FIG. 7C, the third UI visualization 715 corresponds to selecting criteria for the automatic optimization mode. For example, the capacity percentage dropdown list control 732 enables users to select an availability threshold for clusters in the LWD-1 (or any selected LWD). The example cluster topology selection control 730 enables a user to select a cluster to assign an availability threshold to. The availability thresholds in the capacity percentage dropdown list control 732 are expressed as percentages. For example, the selected cluster vi-1-cluster1 is selected to have an availability threshold of 15%. In this example, the cluster vi-1-cluster 1 can be used as a source cluster if that cluster is using 15% or less of its resources.

Figure 7D:
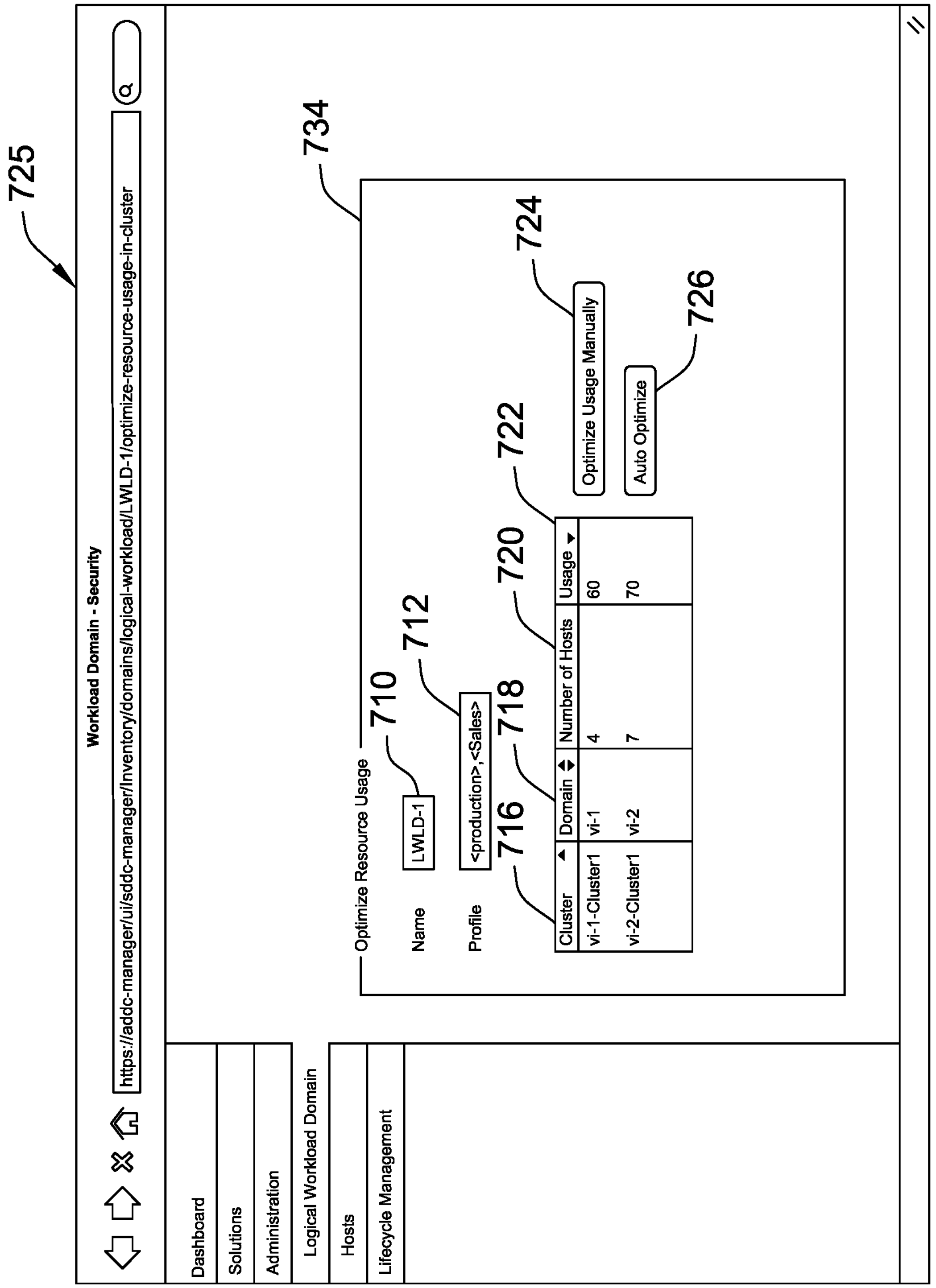

FIG. 7D depicts an example fourth UI visualization 725 corresponding to clusters in a LWD after optimization has been applied. The fourth UI visualization 725 of the illustrated example of FIG. 7D includes the example visualization pane or window 734 that includes the example workload domain name text field 710, the example profile description input text field 712, the example cluster list 716, the example workload domain list 718, the example number of hosts column 720, the example resource usage column 722, the example manual optimization option 724, and an example automatic optimization option 726.

In the illustrated example of FIG. 7D, the fourth UI visualization 725 corresponds to clusters in a LWD after optimization has been applied. For example, the fourth UI visualization 725 depicts that the resource usage, in the example resource usage column 722, has changed for clusters vi-1-Cluster1 and vi-2-Cluster1. The resource usage for vi-1-Cluster1 is 60% instead of 30%. The resource usage for vi-2-Cluster1 is 70% instead of 90%. The fourth UI visualization 725 also depicts that a number of hosts for each of the clusters vi-1-Cluster1 and vi-2-Cluster1 changed after automatic optimization was enabled. In this example, the LWD cluster management controller 108 determined that vi-1-Cluster1 satisfied the assigned availability threshold and, thus, moved a host from vi-1-Cluster1 to vi-2-Cluster1.

Figure 7E:
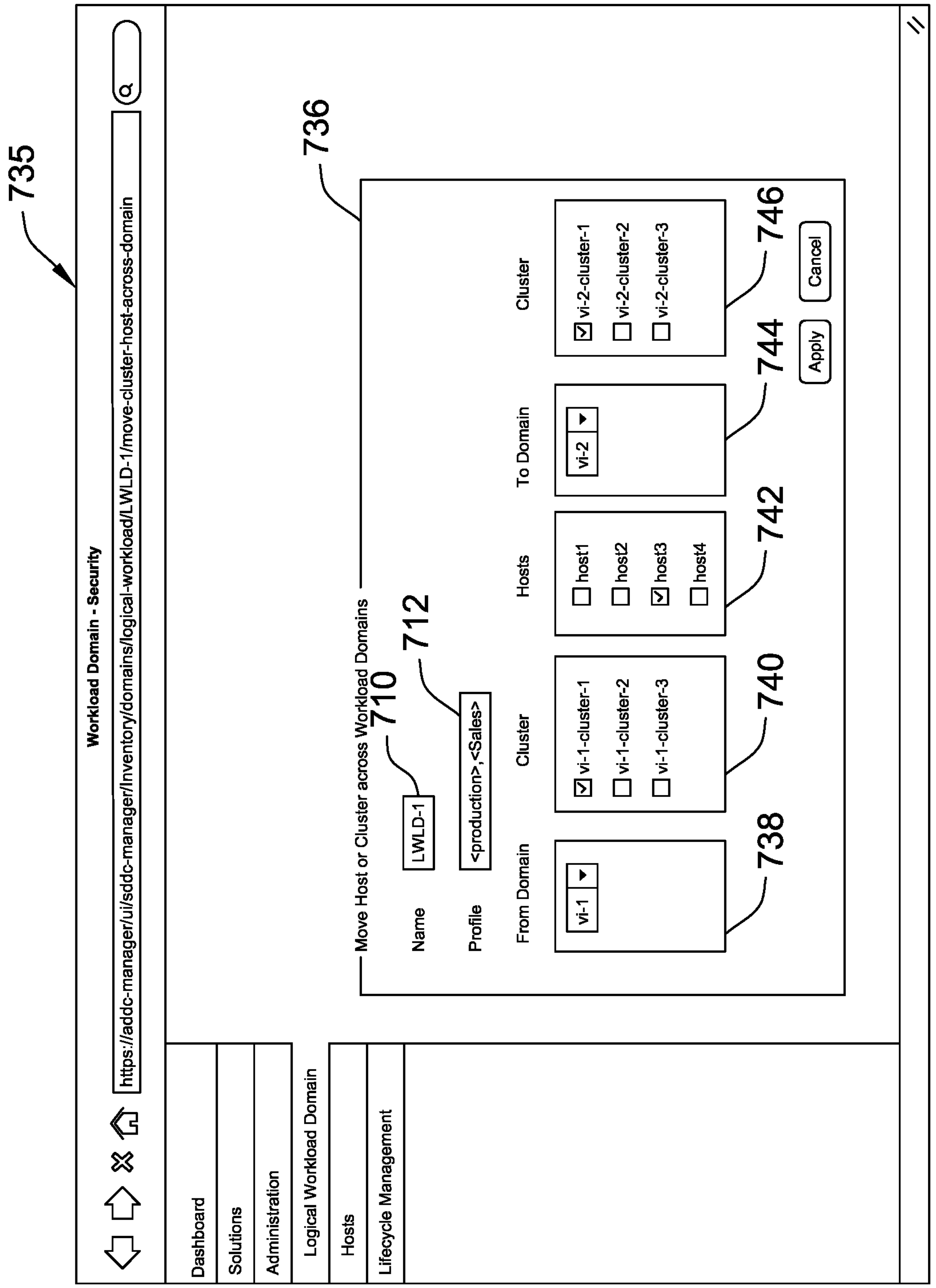

FIG. 7E depicts an example fifth UI visualization 735 corresponding to cluster and host movement from a source workload domain to a destination workload domain, where both source and destination workload domains are in the LWD-1. The fifth UI visualization 735 of the illustrated example of FIG. 7E includes an example visualization pane or window 736 that includes the example workload domain name text field 710, the example profile description input text field 712, an example source workload domain dropdown list control 738, an example source cluster list 740, an example source host list 742, an example destination workload domain dropdown list control 744, and an example destination cluster list 746.

In the illustrated example of FIG. 7E, the fifth UI visualization 735 corresponds to moving clusters between workload domains deployed in a LWD. The example source workload domain dropdown list control 738 enables a user to select a workload domain deployed in LWD-1 from which the user wants to take resources. The example source cluster list 740 appears in the fifth UI visualization 735 when a source workload domain is selected. The source cluster list 740 enables a user to select a cluster from the workload domain. The example source host list 742 appears in the fifth UI visualization 735 when a source cluster is selected. The example source host list 742 enables a user to select one or more hosts from the source cluster to move to a different cluster in a different workload domain. The example destination workload domain dropdown list control 744 enables a user to select a destination workload domain, in LWD-1, to which the selected one or more source hosts are to be reallocated. The example destination cluster list 746 enables the user to select a cluster in the destination workload domain to which the selected one or more source hosts are to be reallocated.

Figure 7F:
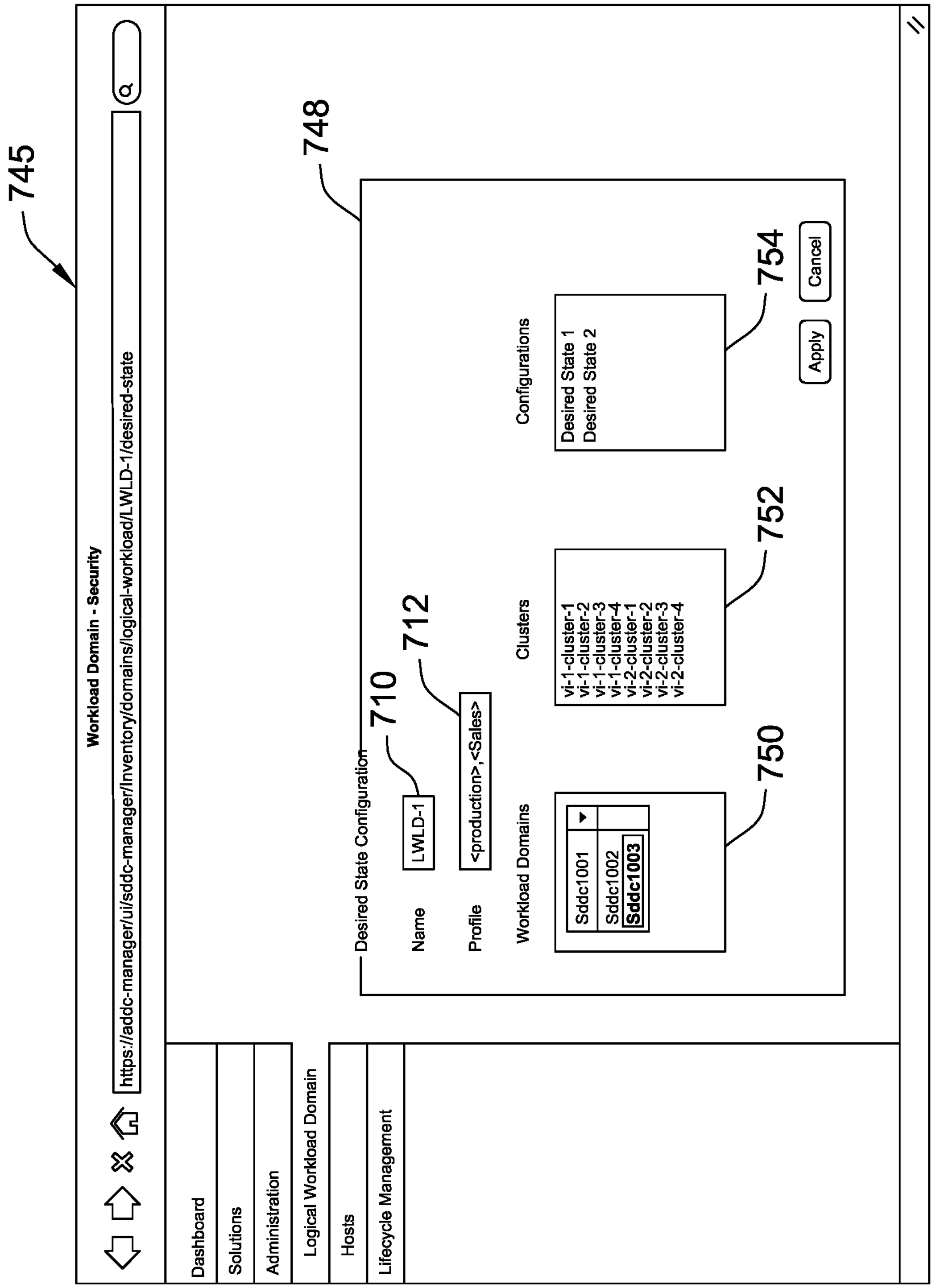

FIG. 7F depicts an example sixth UI visualization 745 corresponding to applying a desired state configuration to clusters in a LWD. The sixth UI visualization 745 of the illustrated example of FIG. 7F includes an example visualization pane or window 748 that includes the example workload domain name text field 710, the example profile description input text field 712, an example SDDC manager dropdown list control 750, an example cluster list 752, and an example configuration list 754.

In the illustrated example of FIG. 7F, the sixth UI visualization 745 corresponds to applying desired state configurations to clusters in a LWD. The example SDDC manager dropdown list control 750 enables users to select an SDDC manager managing a logical group of workload domains (LWD-1) and corresponding clusters. When users select an SDDC manager, the example cluster list 752 provides a list of clusters that can be configured with a desired state. For example, the window 748 displays the clusters managed by the selected SDDC manager. The example configuration list 754 enables users to select which configuration to apply to the listed clusters in the example cluster list 752.

Figure 7G:
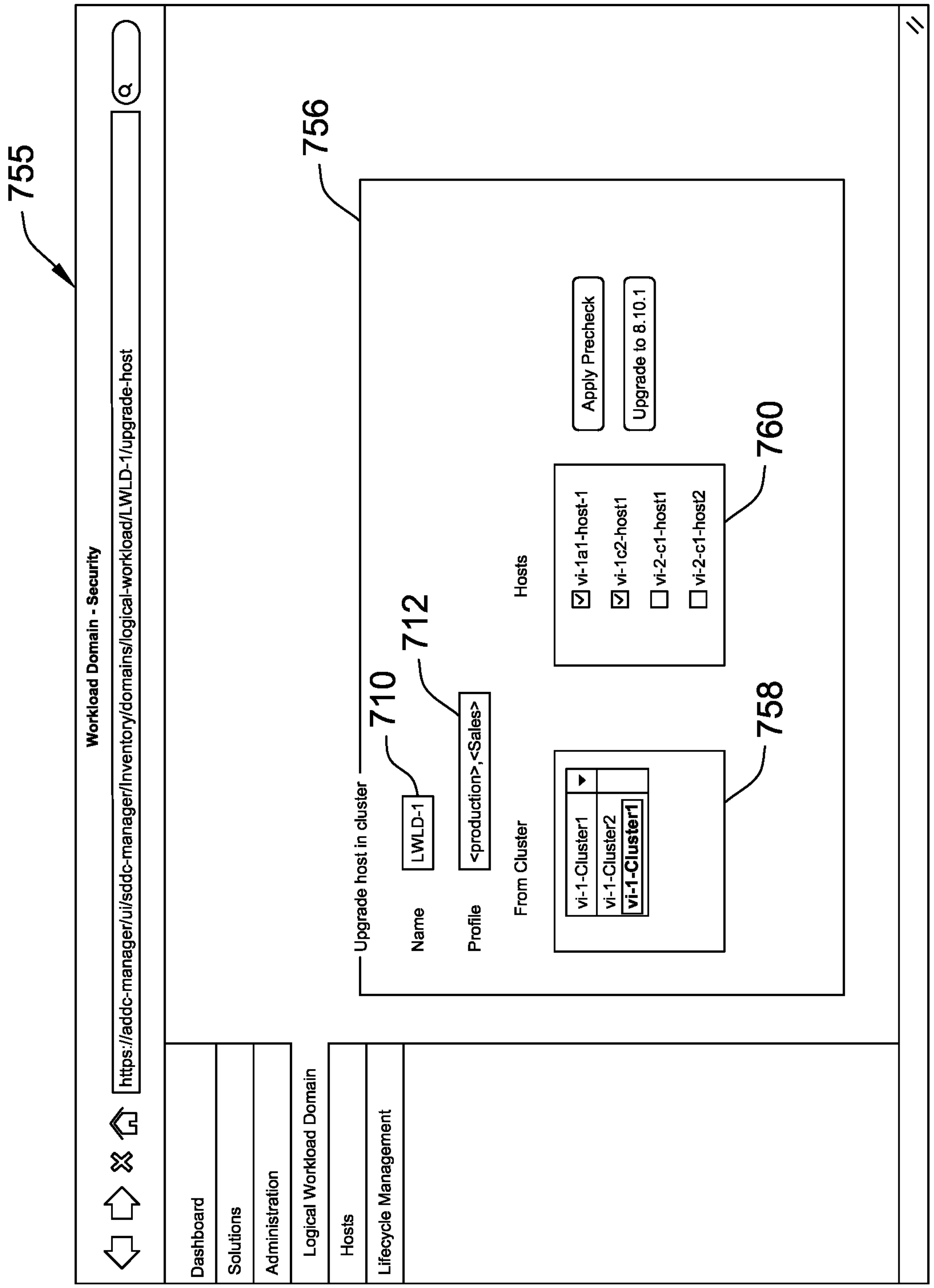

FIG. 7G depicts an example seventh UI visualization 755 corresponding to applying an upgrade to hosts in a LWD. The seventh UI visualization 755 of the illustrated example of FIG. 7G includes an example visualization pane or window 756 that includes the example workload domain name text field 710, the example profile description input text field 712, an example cluster dropdown list control 758, and an example host list 760.

In the illustrated example of FIG. 7G, the seventh UI visualization 755 corresponds to applying a simultaneous upgrade to hosts in a cluster. The example cluster dropdown list control 758 enables users to select a cluster to upgrade. The example host list 760 enables users to select one or more hosts, operating under the selected cluster, to which an upgrade is to be applied.

Figure 8:
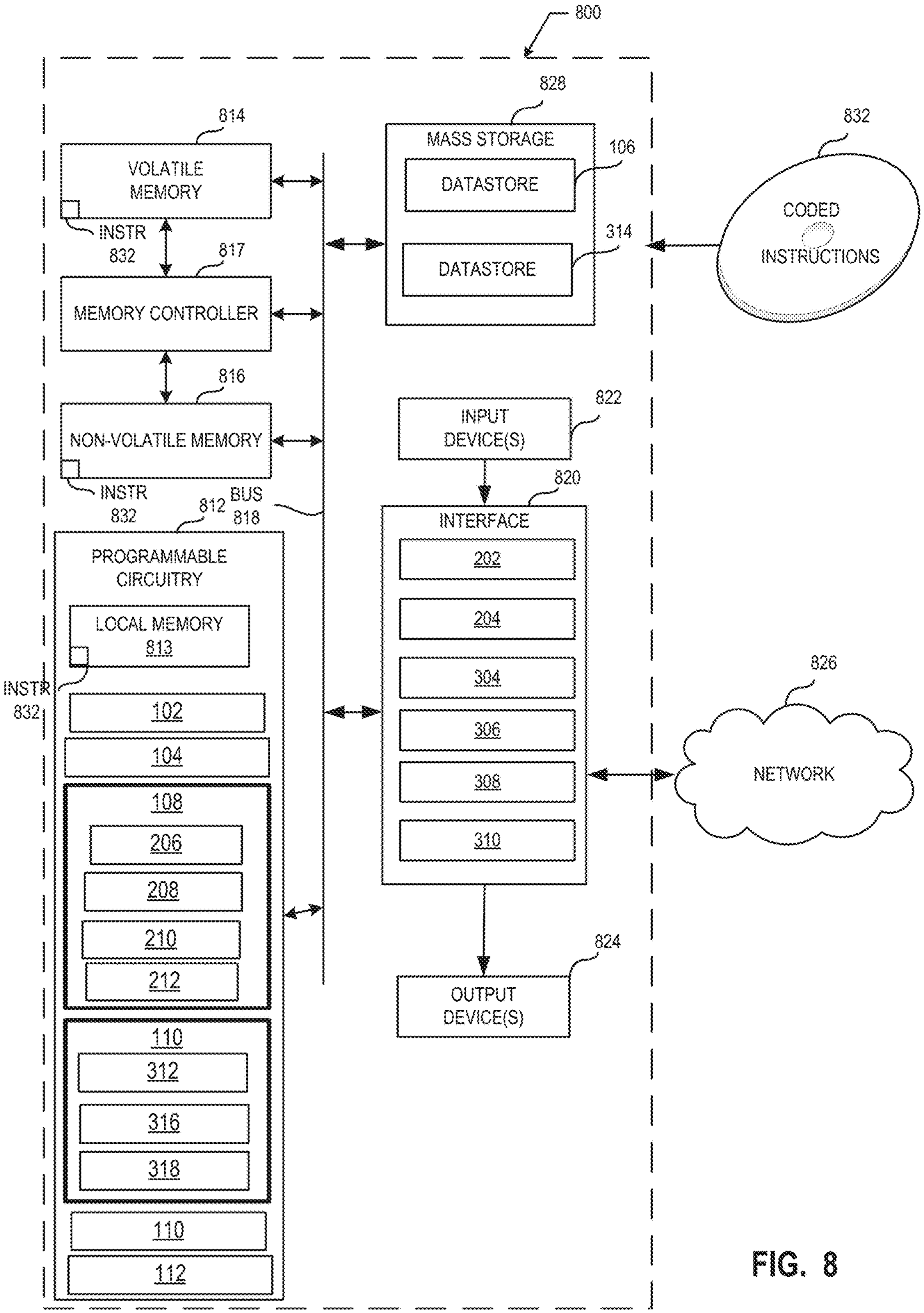
FIG. 8 is a block diagram of an example processing platform including programmable circuitry structured to execute, instantiate, and/or perform the example machine readable instructions and/or perform the example operations of FIGS. 4-6 to implement the LWD cluster management controller of FIG. 2 and the LWD cluster operator controller of FIG. 3.

FIG. 8 is a block diagram of an example programmable circuitry platform 800 structured to execute and/or instantiate the example machine-readable instructions and/or the example operations of FIGS. 4-6 to implement the LWD cluster management controller 108 of FIG. 2 and to implement the LWD cluster operator controller 110 of FIG. 3. The programmable circuitry platform 800 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, or any other type of computing and/or electronic device.

The programmable circuitry platform 800 of the illustrated example includes programmable circuitry 812. The programmable circuitry 812 of the illustrated example is hardware. For example, the programmable circuitry 812 can be implemented by one or more integrated circuits, logic circuits, FPGAs, microprocessors, CPUs, GPUs, DSPs, and/or microcontrollers from any desired family or manufacturer. The programmable circuitry 812 may be implemented by one or more semiconductor based (e.g., silicon based) devices. In this example, the programmable circuitry 812 implements the example LWD management controller 102, the example LWD operator controller 104, the example LWD cluster management controller 108, the example resource monitor controller 206, the example resource optimization controller 208, the example host movement controller 210, the example scheduling controller 212, the example cluster resolver controller 312, the example cluster operations bus 316, the example cluster orchestrator controller 318, and/or, more generally, the example LWD cluster operator controller 110, the example operations management controller 112, and the example lifecycle management controller 114.

The programmable circuitry 812 of the illustrated example includes a local memory 813 (e.g., a cache, registers, etc.). The programmable circuitry 812 of the illustrated example is in communication with main memory 814, 816, which includes a volatile memory 814 and a non-volatile memory 816, by a bus 818. The volatile memory 814 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 816 may be implemented by flash memory and/or any other desired type of memory device. Access to the main memory 814, 816 of the illustrated example is controlled by a memory controller 817. In some examples, the memory controller 817 may be implemented by one or more integrated circuits, logic circuits, microcontrollers from any desired family or manufacturer, or any other type of circuitry to manage the flow of data going to and from the main memory 814, 816.

The programmable circuitry platform 800 of the illustrated example also includes interface circuitry 820. The interface circuitry 820 may be implemented by hardware in accordance with any type of interface standard, such as an Ethernet interface, a universal serial bus (USB) interface, a Bluetooth® interface, a near field communication (NFC) interface, a Peripheral Component Interconnect (PCI) interface, and/or a Peripheral Component Interconnect Express (PCIe) interface. In the illustrated example, the interface circuitry 820 implements the example cluster management control interface 202, the example host management control interface 204, the example upgrade interface 304, the example desired state configuration interface 306, the example certification management interface 308, and the example password management interface 310.

In the illustrated example, one or more input devices 822 are connected to the interface circuitry 820. The input device(s) 822 permit(s) a user (e.g., a human user, a machine user, etc.) to enter data and/or commands into the programmable circuitry 812. The input device(s) 822 can be implemented by, for example, an audio sensor, a microphone, a camera (still or video), a keyboard, a button, a mouse, a touchscreen, a trackpad, a trackball, an isopoint device, and/or a voice recognition system.

One or more output devices 824 are also connected to the interface circuitry 820 of the illustrated example. The output device(s) 824 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 820 of the illustrated example, thus, typically includes a graphics driver card, a graphics driver chip, and/or graphics processor circuitry such as a GPU.

The interface circuitry 820 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 826. The communication can be by, for example, an Ethernet connection, a digital subscriber line (DSL) connection, a telephone line connection, a coaxial cable system, a satellite system, a beyond-line-of-sight wireless system, a line-of-sight wireless system, a cellular telephone system, an optical connection, etc.

The programmable circuitry platform 800 of the illustrated example also includes one or more mass storage discs or devices 828 to store firmware, software, and/or data. Examples of such mass storage discs or devices 828 include magnetic storage devices (e.g., floppy disk, drives, HDDs, etc.), optical storage devices (e.g., Blu-ray disks, CDs, DVDs, etc.), RAID systems, and/or solid-state storage discs or devices such as flash memory devices and/or SSDs. In the illustrated example, the mass storage discs or devices 828 implement the datastore 106 (FIG. 1) and/or the datastore 314 (FIG. 3).

The machine readable instructions 832, which may be implemented by the machine readable instructions of FIGS. 4-6, may be stored in the mass storage device 828, in the volatile memory 814, in the non-volatile memory 816, and/or on at least one non-transitory computer readable storage medium such as a CD or DVD which may be removable.

Figure 9:
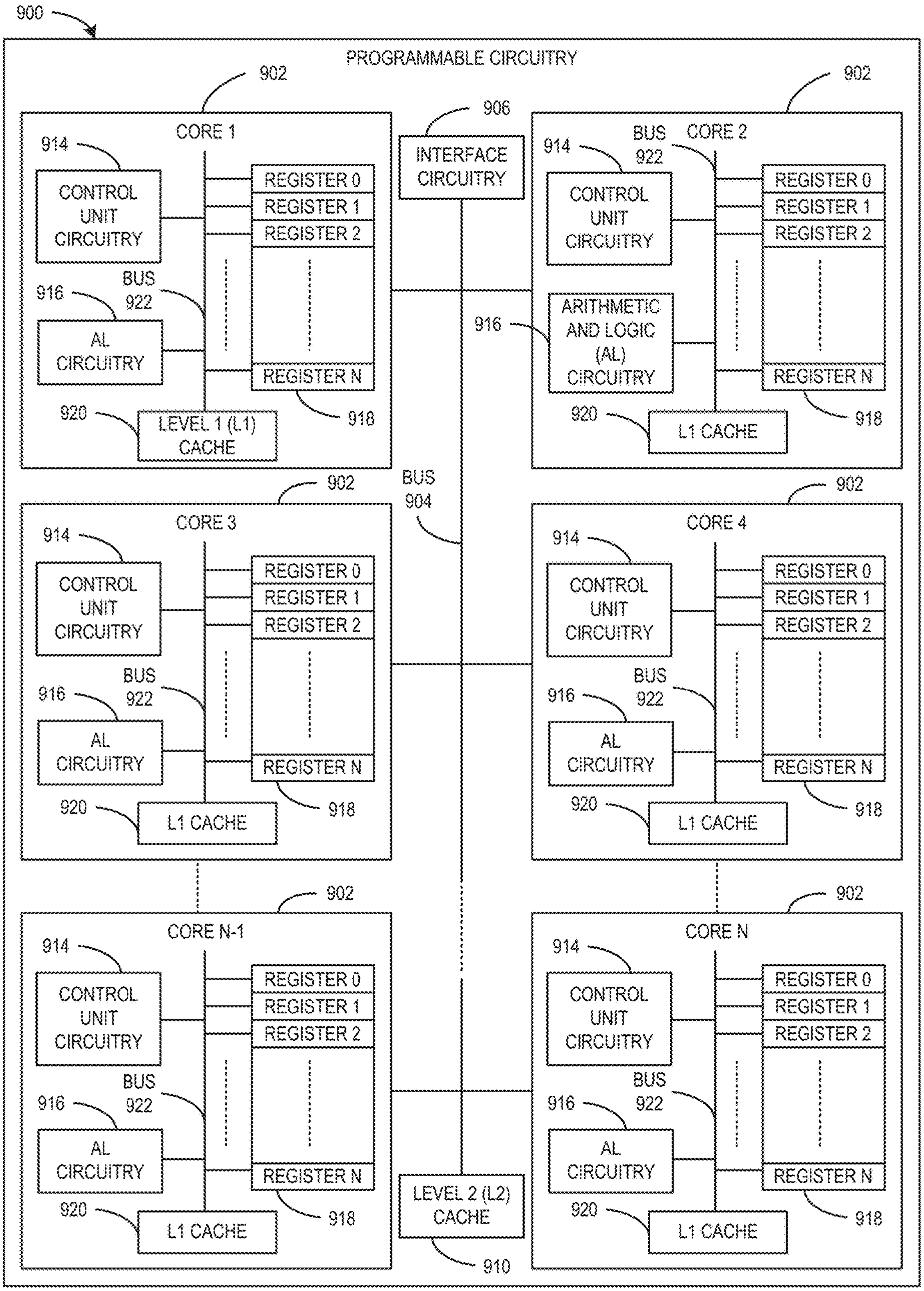
FIG. 9 is a block diagram of an example implementation of the programmable circuitry of FIG. 8.

FIG. 9 is a block diagram of an example implementation of the programmable circuitry 812 of FIG. 8. In this example, the programmable circuitry 812 of FIG. 8 is implemented by a microprocessor 900. For example, the microprocessor 900 may be a general-purpose microprocessor (e.g., general-purpose microprocessor circuitry). The microprocessor 900 executes some or all of the machine-readable instructions of the flowcharts of FIGS. 4-6 to effectively instantiate the circuitry of FIG. 2 as logic circuits to perform operations corresponding to those machine readable instructions. In some such examples, the circuitry of FIGS. 2 and 3 are instantiated by the hardware circuits of the microprocessor 900 in combination with the machine-readable instructions. For example, the microprocessor 900 may be implemented by multi-core hardware circuitry such as a CPU, a DSP, a GPU, an XPU, etc. Although it may include any number of example cores 902 (e.g., 1 core), the microprocessor 900 of this example is a multi-core semiconductor device including N cores. The cores 902 of the microprocessor 900 may operate independently or may cooperate to execute machine readable instructions. For example, machine code corresponding to a firmware program, an embedded software program, or a software program may be executed by one of the cores 902 or may be executed by multiple ones of the cores 902 at the same or different times. In some examples, the machine code corresponding to the firmware program, the embedded software program, or the software program is split into threads and executed in parallel by two or more of the cores 902. The software program may correspond to a portion or all of the machine readable instructions and/or operations represented by the flowcharts of FIGS. 4-6.

The cores 902 may communicate by a first example bus 904. In some examples, the first bus 904 may be implemented by a communication bus to effectuate communication associated with one(s) of the cores 902. For example, the first bus 904 may be implemented by at least one of an Inter-Integrated Circuit (I2C) bus, a Serial Peripheral Interface (SPI) bus, a PCI bus, or a PCIe bus. Additionally or alternatively, the first bus 904 may be implemented by any other type of computing or electrical bus. The cores 902 may obtain data, instructions, and/or signals from one or more external devices by example interface circuitry 906. The cores 902 may output data, instructions, and/or signals to the one or more external devices by the interface circuitry 906. Although the cores 902 of this example include example local memory 920 (e.g., Level 1 (L1) cache that may be split into an L1 data cache and an L1 instruction cache), the microprocessor 900 also includes example shared memory 910 that may be shared by the cores (e.g., Level 2 (L2 cache)) for high-speed access to data and/or instructions. Data and/or instructions may be transferred (e.g., shared) by writing to and/or reading from the shared memory 910. The local memory 920 of each of the cores 902 and the shared memory 910 may be part of a hierarchy of storage devices including multiple levels of cache memory and the main memory (e.g., the main memory 814, 816 of FIG. 8). Typically, higher levels of memory in the hierarchy exhibit lower access time and have smaller storage capacity than lower levels of memory. Changes in the various levels of the cache hierarchy are managed (e.g., coordinated) by a cache coherency policy.

Each core 902 may be referred to as a CPU, DSP, GPU, etc., or any other type of hardware circuitry. Each core 902 includes control unit circuitry 914, arithmetic and logic (AL) circuitry (sometimes referred to as an ALU) 916, a plurality of registers 918, the local memory 920, and a second example bus 922. Other structures may be present. For example, each core 902 may include vector unit circuitry, single instruction multiple data (SIMD) unit circuitry, load/store unit (LSU) circuitry, branch/jump unit circuitry, floating-point unit (FPU) circuitry, etc. The control unit circuitry 914 includes semiconductor-based circuits structured to control (e.g., coordinate) data movement within the corresponding core 902. The AL circuitry 916 includes semiconductor-based circuits structured to perform one or more mathematic and/or logic operations on the data within the corresponding core 902. The AL circuitry 916 of some examples performs integer based operations. In other examples, the AL circuitry 916 also performs floating-point operations. In yet other examples, the AL circuitry 916 may include first AL circuitry that performs integer-based operations and second AL circuitry that performs floating-point operations. In some examples, the AL circuitry 916 may be referred to as an Arithmetic Logic Unit (ALU).

The registers 918 are semiconductor-based structures to store data and/or instructions such as results of one or more of the operations performed by the AL circuitry 916 of the corresponding core 902. For example, the registers 918 may include vector register(s), SIMD register(s), general-purpose register(s), flag register(s), segment register(s), machine-specific register(s), instruction pointer register(s), control register(s), debug register(s), memory management register(s), machine check register(s), etc. The registers 918 may be arranged in a bank as shown in FIG. 9. Alternatively, the registers 918 may be organized in any other arrangement, format, or structure, such as by being distributed throughout the core 902 to shorten access time. The second bus 922 may be implemented by at least one of an I2C bus, a SPI bus, a PCI bus, or a PCIe bus.

Each core 902 and/or, more generally, the microprocessor 900 may include additional and/or alternate structures to those shown and described above. For example, one or more clock circuits, one or more power supplies, one or more power gates, one or more cache home agents (CHAs), one or more converged/common mesh stops (CMSs), one or more shifters (e.g., barrel shifter(s)) and/or other circuitry may be present. The microprocessor 900 is a semiconductor device fabricated to include many transistors interconnected to implement the structures described above in one or more integrated circuits (ICs) contained in one or more packages.

The microprocessor 900 may include and/or cooperate with one or more accelerators (e.g., acceleration circuitry, hardware accelerators, etc.). In some examples, accelerators are implemented by logic circuitry to perform certain tasks more quickly and/or efficiently than can be done by a general-purpose processor. Examples of accelerators include ASICs and FPGAs such as those discussed herein. A GPU, DSP and/or other programmable device can also be an accelerator. Accelerators may be on-board the microprocessor 900, in the same chip package as the microprocessor 900 and/or in one or more separate packages from the microprocessor 900.

Figure 10:
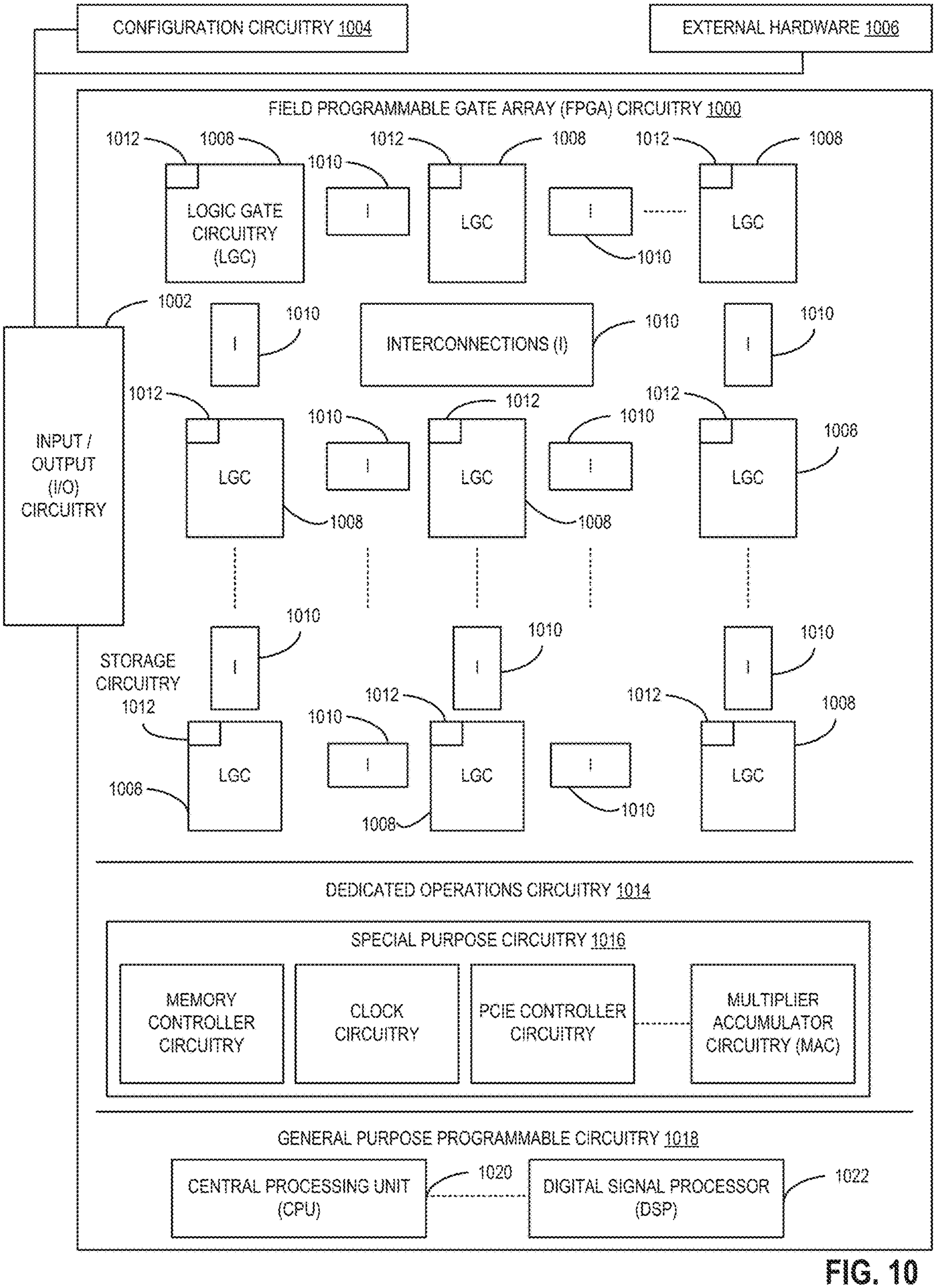
FIG. 10 is a block diagram of another example implementation of the programmable circuitry of FIG. 8.

FIG. 10 is a block diagram of another example implementation of the programmable circuitry 812 of FIG. 8. In this example, the programmable circuitry 812 is implemented by FPGA circuitry 1000. For example, the FPGA circuitry 1000 may be implemented by an FPGA. The FPGA circuitry 1000 can be used, for example, to perform operations that could otherwise be performed by the example microprocessor 900 of FIG. 9 executing corresponding machine readable instructions. However, once configured, the FPGA circuitry 1000 instantiates the operations and/or functions corresponding to the machine readable instructions in hardware and, thus, can often execute the operations/functions faster than they could be performed by a general-purpose microprocessor executing the corresponding software.

More specifically, in contrast to the microprocessor 900 of FIG. 9 described above (which is a general purpose device that may be programmed to execute some or all of the machine readable instructions represented by the flowchart(s) of FIGS. 4-6 but whose interconnections and logic circuitry are fixed once fabricated), the FPGA circuitry 1000 of the example of FIG. 10 includes interconnections and logic circuitry that may be configured, structured, programmed, and/or interconnected in different ways after fabrication to instantiate, for example, some or all of the operations/functions corresponding to the machine readable instructions represented by the flowchart(s) of FIGS. 4-6. In particular, the FPGA circuitry 1000 may be thought of as an array of logic gates, interconnections, and switches. The switches can be programmed to change how the logic gates are interconnected by the interconnections, effectively forming one or more dedicated logic circuits (unless and until the FPGA circuitry 1000 is reprogrammed). The configured logic circuits enable the logic gates to cooperate in different ways to perform different operations on data received by input circuitry. Those operations may correspond to some or all of the instructions (e.g., the software and/or firmware) represented by the flowchart(s) of FIGS. 4-6. As such, the FPGA circuitry 1000 may be configured and/or structured to effectively instantiate some or all of the operations/functions corresponding to the machine readable instructions of the flowchart(s) of FIGS. 4-6 as dedicated logic circuits to perform the operations/functions corresponding to those software instructions in a dedicated manner analogous to an ASIC. Therefore, the FPGA circuitry 1000 may perform the operations/functions corresponding to the some or all of the machine readable instructions of FIGS. 4-6 faster than the general-purpose microprocessor can execute the same.

In the example of FIG. 10, the FPGA circuitry 1000 is configured and/or structured in response to being programmed (and/or reprogrammed one or more times) based on a binary file. In some examples, the binary file may be compiled and/or generated based on instructions in a hardware description language (HDL) such as Lucid, Very High Speed Integrated Circuits (VHSIC) Hardware Description Language (VHDL), or Verilog. For example, a user (e.g., a human user, a machine user, etc.) may write code or a program corresponding to one or more operations/functions in an HDL; the code/program may be translated into a low-level language as needed; and the code/program (e.g., the code/program in the low-level language) may be converted (e.g., by a compiler, a software application, etc.) into the binary file. In some examples, the FPGA circuitry 1000 of FIG. 10 may access and/or load the binary file to cause the FPGA circuitry 1000 of FIG. 10 to be configured and/or structured to perform the one or more operations/functions. For example, the binary file may be implemented by a bit stream (e.g., one or more computer-readable bits, one or more machine-readable bits, etc.), data (e.g., computer-readable data, machine-readable data, etc.), and/or machine-readable instructions accessible to the FPGA circuitry 1000 of FIG. 10 to cause configuration and/or structuring of the FPGA circuitry 1000 of FIG. 10, or portion(s) thereof.

In some examples, the binary file is compiled, generated, transformed, and/or otherwise output from a uniform software platform utilized to program FPGAs. For example, the uniform software platform may translate first instructions (e.g., code or a program) that correspond to one or more operations/functions in a high-level language (e.g., C, C++, Python, etc.) into second instructions that correspond to the one or more operations/functions in an HDL. In some such examples, the binary file is compiled, generated, and/or otherwise output from the uniform software platform based on the second instructions. In some examples, the FPGA circuitry 1000 of FIG. 10 may access and/or load the binary file to cause the FPGA circuitry 1000 of FIG. 10 to be configured and/or structured to perform the one or more operations/functions. For example, the binary file may be implemented by a bit stream (e.g., one or more computer-readable bits, one or more machine-readable bits, etc.), data (e.g., computer-readable data, machine-readable data, etc.), and/or machine-readable instructions accessible to the FPGA circuitry 1000 of FIG. 10 to cause configuration and/or structuring of the FPGA circuitry 1000 of FIG. 10, or portion(s) thereof.

The FPGA circuitry 1000 of FIG. 10, includes example input/output (I/O) circuitry 1002 to obtain and/or output data to/from example configuration circuitry 1004 and/or external hardware 1006. For example, the configuration circuitry 1004 may be implemented by interface circuitry that may obtain a binary file, which may be implemented by a bit stream, data, and/or machine-readable instructions, to configure the FPGA circuitry 1000, or portion(s) thereof. In some such examples, the configuration circuitry 1004 may obtain the binary file from a user, a machine (e.g., hardware circuitry (e.g., programmable or dedicated circuitry) that may implement an Artificial Intelligence/Machine Learning (AI/ML) model to generate the binary file), etc., and/or any combination(s) thereof). In some examples, the external hardware 1006 may be implemented by external hardware circuitry. For example, the external hardware 1006 may be implemented by the microprocessor 900 of FIG. 9.

The FPGA circuitry 1000 also includes an array of example logic gate circuitry 1008, a plurality of example configurable interconnections 1010, and example storage circuitry 1012. The logic gate circuitry 1008 and the configurable interconnections 1010 are configurable to instantiate one or more operations/functions that may correspond to at least some of the machine readable instructions of FIGS. 4-6 and/or other desired operations. The logic gate circuitry 1008 shown in FIG. 10 is fabricated in blocks or groups. Each block includes semiconductor-based electrical structures that may be configured into logic circuits. In some examples, the electrical structures include logic gates (e.g., And gates, Or gates, Nor gates, etc.) that provide basic building blocks for logic circuits. Electrically controllable switches (e.g., transistors) are present within each of the logic gate circuitry 1008 to enable configuration of the electrical structures and/or the logic gates to form circuits to perform desired operations/functions. The logic gate circuitry 1008 may include other electrical structures such as look-up tables (LUTs), registers (e.g., flip-flops or latches), multiplexers, etc.

The configurable interconnections 1010 of the illustrated example are conductive pathways, traces, vias, or the like that may include electrically controllable switches (e.g., transistors) whose state can be changed by programming (e.g., using an HDL instruction language) to activate or deactivate one or more connections between one or more of the logic gate circuitry 1008 to program desired logic circuits.

The storage circuitry 1012 of the illustrated example is structured to store result(s) of the one or more of the operations performed by corresponding logic gates. The storage circuitry 1012 may be implemented by registers or the like. In the illustrated example, the storage circuitry 1012 is distributed amongst the logic gate circuitry 1008 to facilitate access and increase execution speed.

The example FPGA circuitry 1000 of FIG. 10 also includes example dedicated operations circuitry 1014. In this example, the dedicated operations circuitry 1014 includes special purpose circuitry 1016 that may be invoked to implement commonly used functions to avoid the need to program those functions in the field. Examples of such special purpose circuitry 1016 include memory (e.g., DRAM) controller circuitry, PCIe controller circuitry, clock circuitry, transceiver circuitry, memory, and multiplier-accumulator circuitry. Other types of special purpose circuitry may be present. In some examples, the FPGA circuitry 1000 may also include example general purpose programmable circuitry 1018 such as an example CPU 1020 and/or an example DSP 1022. Other general purpose programmable circuitry 1018 may additionally or alternatively be present such as a GPU, an XPU, etc., that can be programmed to perform other operations.

Although FIGS. 9 and 10 illustrate two example implementations of the programmable circuitry 812 of FIG. 8, many other approaches are contemplated. For example, FPGA circuitry may include an on-board CPU, such as one or more of the example CPU 1020 of FIG. 9. Therefore, the programmable circuitry 812 of FIG. 8 may additionally be implemented by combining at least the example microprocessor 900 of FIG. 9 and the example FPGA circuitry 1000 of FIG. 10. In some such hybrid examples, one or more cores 902 of FIG. 9 may execute a first portion of the machine readable instructions represented by the flowchart(s) of FIGS. 4-6 to perform first operation(s)/function(s), the FPGA circuitry 1000 of FIG. 10 may be configured and/or structured to perform second operation(s)/function(s) corresponding to a second portion of the machine readable instructions represented by the flowcharts of FIG. 4-6, and/or an ASIC may be configured and/or structured to perform third operation(s)/function(s) corresponding to a third portion of the machine readable instructions represented by the flowcharts of FIGS. 4-6.

It should be understood that some or all of the circuitry of FIGS. 2 and 3 may, thus, be instantiated at the same or different times. For example, same and/or different portion(s) of the microprocessor 900 of FIG. 9 may be programmed to execute portion(s) of machine-readable instructions at the same and/or different times. In some examples, same and/or different portion(s) of the FPGA circuitry 1000 of FIG. 10 may be configured and/or structured to perform operations/functions corresponding to portion(s) of machine-readable instructions at the same and/or different times.

In some examples, some or all of the circuitry of FIGS. 2 and 3 may be instantiated, for example, in one or more threads executing concurrently and/or in series. For example, the microprocessor 900 of FIG. 9 may execute machine readable instructions in one or more threads executing concurrently and/or in series. In some examples, the FPGA circuitry 1000 of FIG. 10 may be configured and/or structured to carry out operations/functions concurrently and/or in series. Moreover, in some examples, some or all of the circuitry of FIGS. 2 and 3 may be implemented within one or more virtual machines and/or containers executing on the microprocessor 900 of FIG. 9.

In some examples, the programmable circuitry 812 of FIG. 8 may be in one or more packages. For example, the microprocessor 900 of FIG. 9 and/or the FPGA circuitry 1000 of FIG. 10 may be in one or more packages. In some examples, an XPU may be implemented by the programmable circuitry 812 of FIG. 8, which may be in one or more packages. For example, the XPU may include a CPU (e.g., the microprocessor 900 of FIG. 9, the CPU 1020 of FIG. 10, etc.) in one package, a DSP (e.g., the DSP 1022 of FIG. 10) in another package, a GPU in yet another package, and an FPGA (e.g., the FPGA circuitry 1000 of FIG. 10) in still yet another package.

Figure 11:
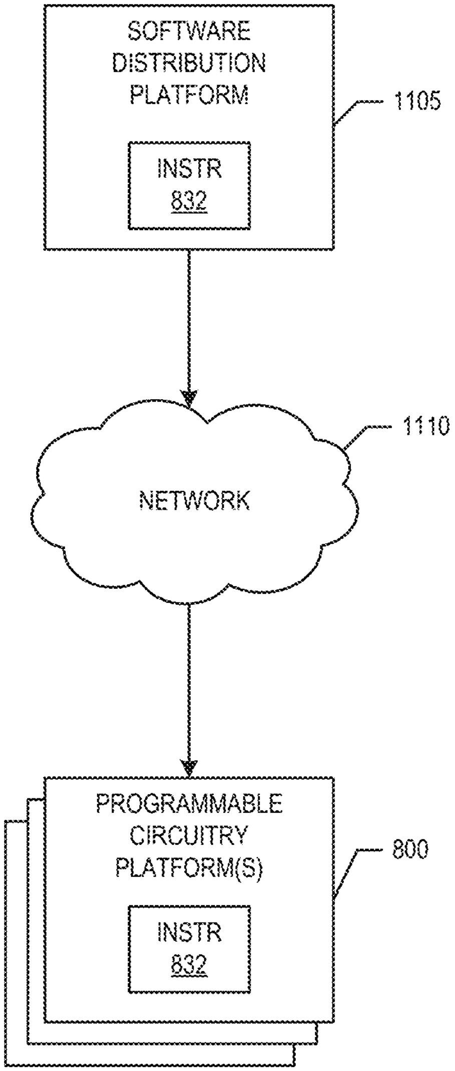
FIG. 11 is a block diagram of an example software/firmware/instructions distribution platform (e.g., one or more servers) to distribute software, instructions, and/or firmware (e.g., corresponding to the example machine readable instructions of FIGS. 4-6) to client devices associated with end users and/or consumers (e.g., for license, sale, and/or use), retailers (e.g., for sale, re-sale, license, and/or sub-license), and/or original equipment manufacturers (OEMs) (e.g., for inclusion in products to be distributed to, for example, retailers and/or to other end users such as direct buy customers).

A block diagram illustrating an example software distribution platform 1105 to distribute software such as the example machine readable instructions 832 of FIG. 8 to other hardware devices (e.g., hardware devices owned and/or operated by third parties from the owner and/or operator of the software distribution platform) is illustrated in FIG. 11. The example software distribution platform 1105 may be implemented by any computer server, data facility, cloud service, etc., capable of storing and transmitting software to other computing devices. The third parties may be customers of the entity owning and/or operating the software distribution platform 1105. For example, the entity that owns and/or operates the software distribution platform 1105 may be a developer, a seller, and/or a licensor of software such as the example machine readable instructions 832 of FIG. 8. The third parties may be consumers, users, retailers, OEMs, etc., who purchase and/or license the software for use and/or re-sale and/or sub-licensing. In the illustrated example, the software distribution platform 1105 includes one or more servers and one or more storage devices. The storage devices store the machine readable instructions 832, which may correspond to the example machine readable instructions of FIGS. 4-6, as described above. The one or more servers of the example software distribution platform 1105 are in communication with an example network 1110, which may correspond to any one or more of the Internet and/or any of the example networks described above. In some examples, the one or more servers are responsive to requests to transmit the software to a requesting party as part of a commercial transaction. Payment for the delivery, sale, and/or license of the software may be handled by the one or more servers of the software distribution platform and/or by a third party payment entity. The servers enable purchasers and/or licensors to download the machine readable instructions 832 from the software distribution platform 1105. For example, the software, which may correspond to the example machine readable instructions of FIG. 4-6, may be downloaded to the example programmable circuitry platform 800, which is to execute the machine readable instructions 832 to implement the LWD cluster management controller 108 of FIG. 2 and the LWD cluster operator controller 110 of FIG. 3. In some examples, one or more servers of the software distribution platform 1105 periodically offer, transmit, and/or force updates to the software (e.g., the example machine readable instructions 832 of FIG. 8) to ensure improvements, patches, updates, etc., are distributed and applied to the software at the end user devices. Although referred to as software above, the distributed "software" could alternatively be firmware.

From the foregoing, it will be appreciated that example systems, apparatus, articles of manufacture, and methods have been disclosed that apply resource optimization and services at a cluster level to clusters in a logical workload domain. For example, examples disclosed herein enable an organization to apply upgrades, security policies, desired state configurations, and resource usage optimization at a lower level of granularity in a logical workload domain, relative to the level of granularity previously provided. Disclosed systems, apparatus, articles of manufacture, and methods improve the efficiency of using a computing device by reducing computation cycles required to apply services to clusters operating in a workload domain and improves the efficiency of using a computing device by regularly checking for critical conditions in the computing device and acting to eliminate the critical conditions to improve execution of an application or workload. Disclosed systems, apparatus, articles of manufacture, and methods are accordingly directed to one or more improvement(s) in the operation of a machine such as a computer or other electronic and/or mechanical device.

The following claims are hereby incorporated into this Detailed Description by this reference. Although certain example systems, apparatus, articles of manufacture, and methods have been disclosed herein, the scope of coverage of this patent is not limited thereto. On the contrary, this patent covers all systems, apparatus, articles of manufacture, and methods fairly falling within the scope of the claims of this patent.

What is claimed is:

1. An apparatus comprising:

interface circuitry;

machine readable instructions; and programmable circuitry to at least one of instantiate or execute the machine readable instructions to perform load balancing of hosts across clusters of hosts, the load balancing including:

periodically acquiring resource usage data corresponding to a plurality of clusters in a logical workload domain including a first workload domain and a second workload domain that are independently configurable workload domains and are logically grouped based on a workload-domain grouping criterion, wherein the first workload domain includes a plurality of clusters including a first cluster and the second workload domain includes a plurality of clusters including a second cluster, and a first set of hosts is allocated to the first cluster and a second set of hosts is allocated to the second cluster;

based on the periodically acquired resource usage data, determining that a first resource usage of the first cluster exceeds a threshold indicative of an upper limit of resource usage in the first cluster;

based on the periodically acquired resource usage data, determining that the second cluster has one or more available hosts; and reallocating a host from the second cluster to the first cluster by reconfiguring the host with information corresponding to the first cluster.

2. The apparatus of claim 1, wherein the load balancing performed by the programmable circuitry further includes calculating the first resource usage and a second resource usage of the second cluster after the host is reallocated from the second cluster to the first cluster.

3. The apparatus of claim 1, wherein the load balancing performed by the programmable circuitry further includes comparing a second resource usage of the second cluster to a second threshold to determine that the second cluster has the one or more available hosts.

4. The apparatus of claim 1, wherein the load balancing performed by the programmable circuitry further includes:

calculating the first resource usage and a second resource usage of the second cluster after the host is reallocated from the second cluster to the first cluster;

comparing the calculated first resource usage and the calculated second resource usage to the threshold;

determining that the first resource usage and the second resource usage each exceeds the threshold;

comparing a third resource usage of a third cluster in the first workload domain to the threshold to determine whether the third cluster has one or more available hosts; and reallocating a host from the third cluster to the first cluster.

5. The apparatus of claim 1, wherein the load balancing performed by the programmable circuitry further includes:

based on the periodically acquired resource usage data, determining that a third cluster in the first workload domain or the second workload domain has one or more available hosts; and prior to reallocating the host from the second cluster to the first cluster, determining that a second resource usage of the second cluster is less than a third resource usage of the third cluster.

6. The apparatus of claim 1, wherein the logical workload domain further includes a third workload domain, and the load balancing performed by the programmable circuitry further includes:

based on the periodically acquired resource usage data, determining that a third cluster in the third workload domain has one or more available hosts; and prior to reallocating the host from the second cluster to the first cluster, determining that a second resource usage of the second cluster is less than a third resource usage of the third cluster.

7. A non-transitory computer readable storage medium comprising instructions to cause programmable circuitry to perform load balancing of hosts across clusters of hosts, the load balancing including:

periodically acquiring resource usage data corresponding to a plurality of clusters in a logical workload domain including a first workload domain and a second workload domain that are independently configurable workload domains and are logically grouped based on a workload-domain grouping criterion, wherein the first workload domain includes a plurality of clusters including a first cluster and the second workload domain includes a plurality of clusters including a second cluster, and a first set of hosts are allocated to the first cluster and a second set of hosts are allocated to the second cluster;

based on the periodically acquired resource usage data, determining that a first resource usage of the first cluster exceeds a threshold indicative of an upper limit of resource usage in the first cluster;

based on the periodically acquired resource usage data, determining that the second cluster has one or more available hosts; and reallocating a host from the second cluster to the first cluster by reconfiguring the host with information corresponding to the first cluster.

8. The non-transitory computer readable storage medium of claim 7, wherein the load balancing performed by the programmable circuitry further includes calculating the first resource usage and a second resource usage of the second cluster after the host is reallocated from the second cluster to the first cluster.

9. The non-transitory computer readable storage medium of claim 7, wherein the load balancing performed by the programmable circuitry further includes comparing a second resource usage of the second cluster to a second threshold to determine that the second cluster has the one or more available hosts.

10. The non-transitory computer readable storage medium of claim 7, wherein the load balancing performed by the programmable circuitry further includes:

calculating the first resource usage and a second resource usage of the second cluster after the host is reallocated from the second cluster to the first cluster;

comparing the calculated first resource usage and the calculated second resource usage to the threshold;

determining that the first resource usage and the second resource usage each exceeds the threshold;

comparing a third resource usage of a third cluster in the first workload domain to the threshold to determine whether the third cluster has one or more available hosts; and reallocating a host from the third cluster to the first cluster.

11. The non-transitory computer readable storage medium of claim 7, wherein the load balancing performed by the programmable circuitry further includes:

based on the periodically acquired resource usage data, determining that a third cluster in the first workload domain or the second workload domain has one or more available hosts; and prior to reallocating the host from the second cluster to the first cluster, determining that a second resource usage of the second cluster is less than a third resource usage of the third cluster.

12. The non-transitory computer readable storage medium of claim 7, wherein the load balancing performed by the programmable circuitry further includes:

based on the periodically acquired resource usage data, determining that a third cluster in a third workload domain has one or more available hosts; and prior to reallocating the host from the second cluster to the first cluster, determining that a second resource usage of the second cluster is less than a third resource usage of the third cluster.

13. A method executed by programmable circuitry to perform load balancing of hosts across clusters of hosts, comprising:

periodically acquiring resource usage data corresponding to a plurality of clusters in a logical workload domain including a first workload domain and a second workload domain that are independently configurable workload domains and are logically grouped based on a workload-domain grouping criterion, wherein the first workload domain includes a plurality of clusters including a first cluster and the second workload domain includes a plurality of clusters including a second cluster, and a first set of hosts are allocated to the first cluster and a second set of hosts are allocated to the second cluster;

based on the periodically acquired resource usage data, determining that a first resource usage of the first cluster exceeds a threshold indicative of an upper limit of resource usage in the first cluster;

based on the periodically acquired resource usage data, determining that the second cluster has one or more available hosts; and reallocating a host from the second cluster to the first cluster by reconfiguring the host with information corresponding to the first cluster.

14. The method of claim 13, further comprising calculating the first resource usage and a second resource usage of the second cluster after the host is reallocated from the second cluster to the first cluster.

15. The method of claim 13, further comprising comparing a second resource usage of the second cluster to a second threshold to determine that the second cluster has the one or more available hosts.

16. The method of claim 13, further comprising:

calculating the first resource usage and a second resource usage of the second cluster after the host is reallocated from the second cluster to the first cluster;

comparing the calculated first resource usage and the calculated second resource usage to the threshold;

determining that the first resource usage and the second resource usage each exceeds the threshold;

comparing a third resource usage of a third cluster in the first workload domain to the threshold to determine whether the third cluster has one or more available hosts; and reallocating a host from the third cluster to the first cluster.

17. The method of claim 13, further comprising:

based on the periodically acquired resource usage data, determining that a third cluster in the first workload domain or the second workload domain has one or more available hosts; and prior to reallocating the host from the second cluster to the first cluster, determining that a second resource usage of the second cluster is less than a third resource usage of the third cluster.

18. The method of claim 13, further comprising:

based on the periodically acquired resource usage data, determining that a third cluster in a third workload domain has one or more available hosts; and prior to reallocating the host from the second cluster to the first cluster, determining that a second resource usage of the second cluster is less than a third resource usage of the third cluster.

* * * * *